US010011715B2

(12) United States Patent
Washio et al.

(10) Patent No.: US 10,011,715 B2
(45) Date of Patent: Jul. 3, 2018

(54) POLYESTER RESIN COMPOSITION, MANUFACTURING METHOD THEREFOR, AND CAMERA MODULE CONTAINING SAID POLYESTER RESIN COMPOSITION

(71) Applicant: Mitsui Chemicals, Inc., Minato-ku, Tokyo (JP)

(72) Inventors: Isao Washio, Chiba (JP); Hideto Ogasawara, Sodegaura (JP); Hiroki Ebata, Yokohama (JP); Fumio Kageyama, Ichihara (JP); Nobuhiro Takizawa, Kamakura (JP); Akinori Amano, Chiba (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 51 days.

(21) Appl. No.: 14/443,811

(22) PCT Filed: Nov. 19, 2013

(86) PCT No.: PCT/JP2013/006764
§ 371 (c)(1),
(2) Date: May 19, 2015

(87) PCT Pub. No.: WO2014/076971
PCT Pub. Date: May 22, 2014

(65) Prior Publication Data
US 2015/0274964 A1    Oct. 1, 2015

(30) Foreign Application Priority Data

Nov. 19, 2012 (JP) .................. 2012-253430
Nov. 21, 2012 (JP) .................. 2012-255663
Jul. 4, 2013  (JP) .................. 2013-140533

(51) Int. Cl.
*C08L 67/02* (2006.01)
*C08L 23/08* (2006.01)
*C08K 3/00* (2018.01)
*C08L 67/00* (2006.01)
*C08K 3/013* (2018.01)
*C08K 3/016* (2018.01)
*C08L 25/18* (2006.01)

(52) U.S. Cl.
CPC .............. *C08L 67/02* (2013.01); *C08K 3/00* (2013.01); *C08K 3/013* (2018.01); *C08K 3/016* (2018.01); *C08L 23/08* (2013.01); *C08L 23/0846* (2013.01); *C08L 23/0884* (2013.01); *C08L 67/00* (2013.01); *C08L 25/18* (2013.01); *C08L 2201/02* (2013.01); *C08L 2205/03* (2013.01); *C08L 2207/04* (2013.01)

(58) Field of Classification Search
CPC ......................................................... C08L 67/02
See application file for complete search history.

(56) References Cited

U.S. PATENT DOCUMENTS

| 4,713,407 A  * | 12/1987 | Bailey ....................... C08K 3/34 |
|  |  | 524/109 |
| 4,892,851 A | 1/1990 | Ewen et al. |
| 4,914,145 A  * | 4/1990 | Tohdoh ..................... C08K 5/00 |
|  |  | 524/104 |
| 4,952,649 A | 8/1990 | Kioka et al. |
| 4,971,937 A | 11/1990 | Albizzati et al. |
| 5,036,064 A | 7/1991 | Ewen |
| 5,428,086 A | 6/1995 | Minnick et al. |
| 5,539,067 A | 7/1996 | Parodl et al. |
| 5,618,771 A | 4/1997 | Parodl et al. |
| 5,731,390 A | 3/1998 | Helmond |
| 6,194,342 B1 | 2/2001 | Parodl et al. |
| 6,326,435 B1 | 12/2001 | Takayama et al. |
| 6,515,085 B1 | 2/2003 | Parodl et al. |
| 6,562,902 B1 * | 5/2003 | Fischer .................. C08F 265/04 |
|  |  | 523/500 |
| 6,939,928 B1 | 9/2005 | Kawai et al. |
| 2002/0169254 A1 | 11/2002 | Hirano et al. |

(Continued)

FOREIGN PATENT DOCUMENTS

JP    57-063310 A    4/1982
JP    58-83006 A     5/1983
(Continued)

OTHER PUBLICATIONS

International Search Report (PCT/ISA/210) dated Mar. 4, 2014, by the Japanese Patent Office as the International Searching Authority for International Application No. PCT/JP2013/006764.
(Continued)

Primary Examiner — Vickey Nerangis
(74) Attorney, Agent, or Firm — Buchanan, Ingersoll & Rooney PC

(57) ABSTRACT

The purpose of the present invention is to provide a polyester resin with improved mechanical properties, molding performance, and, preferably, fire retardancy. This polyester resin composition contains the following: a polyester resin (A) that has a melting point or glass transition temperature of at least 250° C.; a thermoplastic resin (B) that has an olefin-derived constitutional unit and an aromatic hydrocarbon structure and has an intrinsic viscosity ([η]), as measured in decalin at 135° C., of 0.04 to 1.0 dl/g; and a copolymer (C) that has an olefin-derived constitutional unit, an α,β-unsaturated-carboxylic-ester-derived constitutional unit, and a cyclic oxy-hydrocarbon structure.

13 Claims, 2 Drawing Sheets

(56) References Cited

U.S. PATENT DOCUMENTS

| | | |
|---|---|---|
| 2003/0055179 A1 | 3/2003 | Ota et al. |
| 2007/0213458 A1 | 9/2007 | Topoulos |
| 2010/0028579 A1 | 2/2010 | Arpin |
| 2011/0114883 A1 | 5/2011 | Murouchi et al. |
| 2012/0216394 A1* | 8/2012 | Kitaura ............... H01M 10/052 29/623.2 |
| 2013/0253118 A1 | 9/2013 | Shiraishi et al. |

FOREIGN PATENT DOCUMENTS

| | | |
|---|---|---|
| JP | 02-41303 A | 2/1990 |
| JP | 03-706 A | 1/1991 |
| JP | 03-193796 A | 8/1991 |
| JP | 04-218508 A | 8/1992 |
| JP | 05-501274 A | 3/1993 |
| JP | 05-140424 A | 6/1993 |
| JP | 06-016912 A | 1/1994 |
| JP | 06-025517 A | 2/1994 |
| JP | 2002-30197 A | 1/2002 |
| JP | 2002-509565 A | 3/2002 |
| JP | 2003-105022 A | 4/2003 |
| JP | 3476793 B2 | 12/2003 |
| JP | 2005-316539 A | 11/2005 |
| JP | 2009-242456 A | 10/2009 |
| JP | 2010-286544 A | 12/2010 |
| JP | 2011-529978 A | 12/2011 |
| JP | 2012-087171 A | 5/2012 |
| JP | 2012-136710 A | 7/2012 |
| KR | 10-2002-0031184 A | 4/2002 |
| WO | WO 8503718 A1 * | 8/1985 ............. C08L 67/02 |
| WO | WO 00/55256 A1 | 9/2000 |
| WO | WO 01/27124 A1 | 4/2001 |
| WO | WO 01/53369 A1 | 7/2001 |

OTHER PUBLICATIONS

Written Opinion (PCT/ISA/237) dated Mar. 4, 2014, by the Japanese Patent Office as the International Searching Authority for International Application No. PCT/JP2013/006764.

* cited by examiner

POLYESTER RESIN COMPOSITION, MANUFACTURING METHOD THEREFOR, AND CAMERA MODULE CONTAINING SAID POLYESTER RESIN COMPOSITION

TECHNICAL FIELD

The present invention relates to a polyester resin composition, a manufacturing method thereof, and a camera module including the same.

BACKGROUND ART

Polycyclohexanedimethylene terephthalate (PCT) is excellent in mechanical properties and in chemical resistance, and in addition has a higher thermal deformation temperature compared to general polyesters such as polybutylene terephthalate and polyethylene terephthalate. Therefore, there has been an expectation for PCT to be developed in applications such as electric and electronic equipment components, automobile components, and mechanical components, from which heat resistance is required.

However, the polymerization degree of PCT was easily lowered during molding, and thus the mechanical physical properties were easily lowered during molding residence in a short period of time, making it difficult to put it into practical use as a molding material. Further, PCT has low toughness and thus is fragile, so that there is a concern that a problem may occur during the use of the product.

As a means for enhancing the residence stability of PCT, there has been proposed a method of adding an epoxy compound to polyethylene terephthalate, or the like that is a similar terephthalic acid-based polyester (see PTL 1, for example). Examples of other means that have been proposed for enhancing the residence stability of PCT include a method for adding a phenol epoxy compound branched in three directions or a trifunctional allyl isocyanurate compound, a method of adding a phenoxy resin, and a method of adding a glycidyl ether ester compound (see PTL 2, for example).

As a means for improving toughness, there has been proposed a method of adding an olefin-based elastomer having an epoxy group to a polyester (see PTL 3, for example). As another means for improving toughness, there has been proposed a method of combining the above two techniques for enhancing residence stability (see PTLS 1 and 2, for example).

Further, when using a resin material for the application of electric and electronic equipment components, it is required to satisfy the flame retardancy (V-0) in accordance with flame retardancy standard (UL 94) by Underwriters Laboratories (UL) in the US, which is commonly used as an index of flame retardancy of resins. UL 94 standard includes regulations not only for the burning time of a resin during burning, but also for the drip of an ignition source; when a resin is dripped in contact with flame in vertical combustion test, it is required that a specified amount of cotton set at the lower part of a test piece should not be ignited by the drip. In addition to satisfying such high flame retardancy, it is required to have better mechanical characteristics.

Examples of methods that have been proposed for these problems include a method of adding a graft copolymer obtained by reacting an olefin-glycidyl(meth)acrylate copolymer with a (meth)acrylic ester monomer and an olefin-based resin to flame-retardant PCT (see PTL 4, for example) and a method of adding thereto a multifunctional epoxy compound and an olefin-based elastomer (see PTL 2, for example).

Furthermore, one of the preferable examples of electric and electronic equipment components for which resins such as PCT are used is a camera module. The camera module is an electronic component having a camera function, in which a lens is mounted over a CCD (charge-coupled device)/CMOS (complementary metal oxide semiconductor) imaging element (image sensor). The camera module is installed on mobile phones, laptop computers, digital cameras, digital video cameras, and the like. In a camera module having a typical fixed focus optical system, a CMOS imaging element is mounted on a signal processing chip. Furthermore, the camera module is provided with members such as one or two or more lenses for imaging an optical image on an image sensor, a barrel for holding the lenses, a holder for holding the barrel, and a substrate for holding the image sensor (see FIG. 1).

The barrel and holder need to be adaptive to reflow soldering, from the requirement for downsizing of portable electronic equipment, operations for reducing costs of mounting processes of electronic equipment, or reduction of process time. Therefore, it is necessary for a material for the barrel or holder to have heat resistance beyond 250° C. Furthermore, a material excellent in mechanical characteristics and moldability is required, and currently a liquid crystal resin composition and a semiaromatic polyamide using a long chain diamine are mainly used (see PTLS 5 to 7).

CITATION LIST

Patent Literature

PTL 1
Japanese Patent Application Laid-Open No. HEI 6-25517
PTL 2
Japanese Patent Application Laid-Open No. HEI 6-16912
PTL 3
Japanese Patent Application Laid-Open No. HEI 5-501274
PTL 4
Japanese Patent Application Laid-Open No. HEI 5-140424
PTL 5
Japanese Patent Application Laid-Open No. 2012-87171
PTL 6
Japanese Patent Application Laid-Open No. 2009-242456
PTL 7
Japanese Patent Application Laid-Open No. 2010-286544

SUMMARY OF INVENTION

Technical Problem

Nevertheless, as the present inventors examined the literatures, there were problems remaining, which should be improved, in any of the methods that use the techniques of adding to PCT a compound having a known multifunctional group as set forth in the above-listed PTLS 1 to 3, or the like. That is, in the stages of preparing and molding a resin composition (compound), a polymer having a branched structure tends to be generated too much, and the state in which a chain branching reaction does not easily occur tends to be repeated over time, making it difficult to obtain a resin composition excellent in balanced physical properties capable of affording a molded product having better moldability (such as flowability) and better mechanical characteristics (such as strength and toughness). Accordingly, it is required to achieve the enhancement of the mechanical characteristics and the moldability of a polyester resin.

Further, since PCT has lower melt tension, a drip due to melting of a resin easily occurred in a combustion test specified in the UL standard. Due to the occurrence of the drip, the case of V-2 sometimes took place, which prevented the stable achievement of V-0 standard. On the other hand, in a method of adding a compound having a multifunctional epoxy group reported in PTL 2, or the like, there is no detailed disclosure of flame retardancy for dripping, or the like, and thus the influence of the compound having a multifunctional epoxy group on the flame retardancy of PCT was unknown. Accordingly, it is required to further achieve the enhancement of flame retardancy, in addition to the enhancement of mechanical characteristics and moldability of the polyester resin.

Furthermore, in the process of assembling a camera module, a manual focus adjustment (adjustment of moving a lens barrel part screwed to a holder part by screwing with a screw, and changing the distance between a lens and an image sensor to optimize the focal distance) of optical component systems is necessary. During the adjustment, there is a case where powders (particles) of the resin composition may fall off from the surface of a component. These particles become the cause of bringing a defective image when they are on the CMOS sensor, and they are attached to the surfaces of the image sensor and the lens, causing a black mark or spot to occur, leading to lowered camera performance. Due to enhanced pixel numbers in association with enhanced performance of cameras, even a minute foreign object less than 1 μm sometimes may be the cause of a defected image. Therefore, it is necessary to sufficiently wash each component before assembly, and further an assembled product.

On the other hand, when a constituent component composed of a liquid crystal resin is washed ultrasonically, fibrillation occurs, causing particles to frequently occur, which has been a huge problem. There is a risk that the falling-off of powders may also occur during the use of a product into which that member is incorporated, which is considered to be a huge problem as well.

Furthermore, a lens is installed in a barrel that is a constituent member of a camera module, and in many cases a holder is screwed to the barrel with a screw. Therefore, both the barrel and the holder are required to have higher dimensional precision at the time of manufacture, and in addition it is also required that a dimensional change that occurs due to the influence such as temperature or humidity should not be changed greatly depending on directions (lower anisotropy).

In recent years, much higher dimensional precision has been required for a barrel and a holder in order to meet the further increase of pixel numbers to be processed. Therefore, there is a problem in which a conventional liquid crystal resin or a semiaromatic polyamide cannot be adaptive to these requirements.

In addition, the barrel and the holder are also required to shield light having a wavelength near visible light, in particular, in order to prevent the transmittance of surrounding light.

Also in the review of the present inventors, it was observed that a conventional liquid crystal resin composition had a problem of the occurrence of particles, and a semiaromatic polyamide using a long chain diamine only had insufficient dimensional stability (in particular, dimensional change in association with hygroscopicity), thus requiring further enhancement.

An object of the present invention is to achieve the enhancement of mechanical characteristics and moldability of a polyester resin, and preferably to achieve the further enhancement of flame retardancy. Further, another object of the present invention is to provide a thermoplastic resin composition moldable to a sliding member such as a camera module member excellent particularly in heat resistance and lower particle properties and having extremely better dimensional stability (in particular, dimensional change in association with hygroscopicity), and a component having a sliding structure such as a camera module including the same.

Solution to Problem

[1] A polyester resin composition including: a polyester resin (A) having a melting point or a glass transition temperature of 250° C. or higher; a thermoplastic resin (B) having a structural unit derived from an olefin and an aromatic hydrocarbon structure and having an intrinsic viscosity [η] of 0.04 to 1.0 dl/g measured at 135° C. in decalin; and a copolymer (C) having a structural unit derived from an olefin, a structural unit derived from an α,β-unsaturated carboxylate ester and a structural unit having a cyclic oxyhydrocarbon structure.

[2] The polyester resin composition according to [1], further including an inorganic filler (D).

[3] The polyester resin composition according to [2], including: 30 to 80 parts by mass of the polyester resin (A); 0.1 to 10 parts by mass of the thermoplastic resin (B); 0.5 to 10 parts by mass of the copolymer (C); and 1 to 50 parts by mass of the inorganic filler (D), (provided that the total of (A), (B), (C) and (D) is 100 parts by mass).

[4] The polyester resin composition according to [2], wherein the polyester resin (A) includes a dicarboxylic acid component unit (a1) including 30 to 100 mol % of a dicarboxylic acid component unit derived from terephthalic acid, 0 to 70 mol % of an aromatic dicarboxylic acid component unit other than terephthalic acid, and 0 to 70 mol % of an aliphatic dicarboxylic acid component unit having carbon atoms of 4 to 20, and a dialcohol component unit (a2) including at least one of an alicyclic dialcohol component unit having carbon atoms of 4 to 20 and an aliphatic dialcohol component unit having carbon atoms of 4 to 20.

[5] The polyester resin composition according to [4], wherein the alicyclic dialcohol component unit included in the polyester resin (A) is a component unit having a cyclohexane skeleton.

[6] The polyester resin composition according to [2], wherein the structural unit derived from the olefin included in the thermoplastic resin (B) includes a structural unit derived from ethylene, and the structural unit having the aromatic hydrocarbon structure includes a structural unit derived from styrene.

[7] The polyester resin composition according to any one of [1] to [5], wherein the copolymer (C) is an ethylene-methylacrylate-glycidylmethacrylate copolymer.

[8] The polyester resin composition according to any one of [1] to [7], further including brominated polystyrene or polybrominated styrene (E) and a flame retardant auxiliary (F).

[9] The polyester resin composition according to [8], including 10 to 40 parts by mass of the brominated polystyrene or polybrominated styrene (E) and 1 to 20 parts by mass of the flame retardant auxiliary (F), provided that the total of (A), (B), (C) and (D) is set to 100 parts by mass.

[10] The polyester resin composition according to [8] or [9], wherein the flame retardant auxiliary (F) is at least one compound selected from the group consisting of antimony trioxide, antimony tetroxide, antimony pentoxide, sodium antimonate, zinc borate, zinc stannate, zinc phosphate, calcium borate, and calcium molybdate.

[11] The polyester resin composition according to any one of [8] to [10], wherein the flame retardant auxiliary (F) includes sodium antimonate and zinc borate.

[12] A molded article obtainable by molding the polyester resin composition according to any one of [1] to [11].

[13] An electric or electronic component including an injection-molded article of the polyester resin composition according to any one of [1] to [11].

[14] An automobile mechanism component including an injection-molded article of the polyester resin composition according to any one of [1] to [11].

[15] A method of producing a polyester resin composition including: melting and kneading, 30 to 80 parts by mass of a polyester resin (A) having a melting point or a glass transition temperature of 250° C. or higher, 0.1 to 10 parts by mass of a thermoplastic resin (B) having a structural unit derived from an olefin and an aromatic hydrocarbon structure and having an intrinsic viscosity [η] of 0.04 to 1.0 dl/g measured at 135° C. in decalin, 0.5 to 10 parts by mass of a copolymer (C) having a structural unit derived from an olefin, a structural unit derived from an α,β-unsaturated carboxylate ester and a cyclic oxyhydrocarbon structure, and 1 to 50 parts by mass of an inorganic filler (D), (provided that the total of (A), (B), (C) and (D) is set to 100 parts by mass), at a temperature 5° C. to 30° C. higher than a melting point of the polyester resin (A).

[16] A polyester resin composition for a sliding member, including a polyester resin (A) having a melting point or a glass transition temperature of 250° C. or higher; and a copolymer (C) having a structural unit derived from an olefin, a structural unit derived from an α,β-unsaturated carboxylate ester and a structural unit having a cyclic oxyhydrocarbon structure.

[17] The polyester resin composition for a sliding member according to [16], further including at least one of carbon black (G) and a fibrous inorganic filler (D).

[18] The polyester resin composition for a sliding member according to [16] or [17], including: 30 to 80 parts by mass of the polyester resin (A); 0.5 to 5 parts by mass of the copolymer (C); 0.5 to 5 parts by mass of the carbon black (G); and 20 to 50 parts by mass of the fibrous inorganic filler (D), (provided that the total of (A), (C), (G) and (D) is 100 parts by mass).

[19] The polyester resin composition for a sliding member according to any one of [16] or [18], wherein the polyester resin (A) includes a dicarboxylic acid component unit (a1) including 30 to 100 mol % of a dicarboxylic acid component unit derived from terephthalic acid and 0 to 70 mol % of an aromatic dicarboxylic acid component unit other than terephthalic acid, and a dialcohol component unit (a2) including an alicyclic dialcohol component unit having carbon atoms of 4 to 20.

[20] The polyester resin composition for a sliding member according to [19], wherein the dialcohol component unit (a2) included in the polyester resin (A) includes a component unit having a cyclohexane skeleton.

[21] The polyester resin composition for a sliding member according to any one of [16] to [20], further including a thermoplastic resin (B) having a structural unit derived from an olefin and an aromatic hydrocarbon structure and having an intrinsic viscosity [ρ] of 0.04 to 1.0 dl/g measured at 135° C. in decalin.

[22] The polyester resin composition for a sliding member according to [21], including 0.1 to 10 parts by mass of the thermoplastic resin (B), (provided that the total of (A), (C), (G) and (D) is 100 parts by mass).

[23] The polyester resin composition for a sliding member according to [17], wherein the fibrous inorganic filler (D) is at least one selected from wollastonite and calcium titanate.

[24] The polyester resin composition for a sliding member according to any one of [16] to [23], wherein the copolymer (C) is an ethylene-methylacrylate-glycidylmethacrylate copolymer.

[25] A camera module including the polyester resin composition for a sliding member according to any one of [16] to [24].

Advantageous Effects of Invention

According to the present invention, the enhancement of mechanical characteristics (strength, toughness and residence stability) and the enhancement of moldability (mold releasability and flowability during injection molding) of the polyester resin can be achieved. According to the present invention, the enhancement of flame retardancy of the polyester resin can be achieved, in addition to the enhancements of mechanical characteristics and moldability of the polyester resin.

The present invention provides a polyester resin composition excellent in the dimensional stability (dimensional change in association with hygroscopicity) and mechanical characteristics (such as higher strength, higher elastic modulus, and less deflection) of its molded product. Moreover, the surface smoothness of its molded product is higher, and the occurrence of particles from the molded product is suppressed. In addition, the heat resistance of its molded product is higher, and thus is available even in a high temperature. Therefore, the molded product of the polyester resin composition of the present invention is used suitably as a constituent member of a camera module, in particular, a constituent material for a barrel or a holder.

DESCRIPTION OF EMBODIMENTS

1. Polyester Resin Composition

Figure 1:
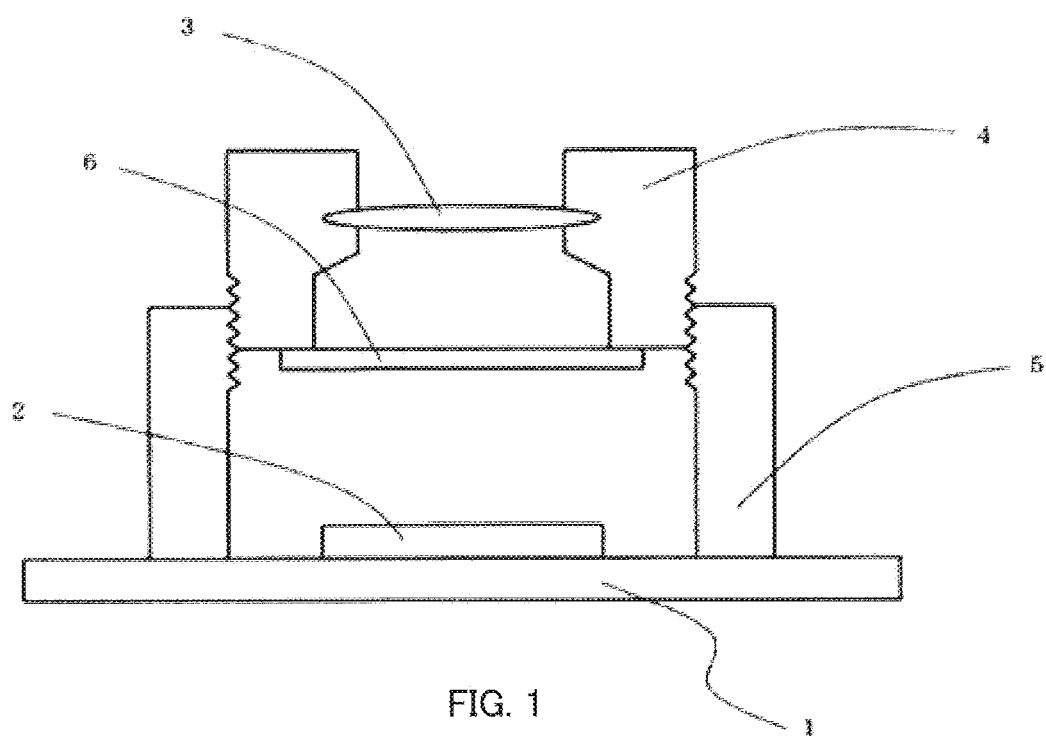
FIG. 1 is a drawing illustrating the outline of a camera module.

The present inventors studied keenly to overcome the above problems, and as a result conceived of using polyester resin (A), an olefin-based copolymer (C) having a specific cyclic oxy structure, and a specific thermoplastic resin (B) having a polyolefin skeleton and an aromatic hydrocarbon structure in combination. As a result, it has been found that a polyester resin composition having better moldability and mechanical characteristics is obtained. Furthermore, it has been found that, by applying a specific flame retardant formulation, stable V-0 standard can be achieved in which a drip does not occur in the combustion test in the UL standard.

Further, the present inventors have found that a composition including a polyester resin (A) having a higher melting point or glass transition temperature, and an olefin-based copolymer (C) having a specific cyclic oxy structure is excellent in heat resistance and mechanical properties, and has both the characteristics demonstrating better lower particle properties and dimensional stability, and that the composition is suitable as a composition to be used as a sliding member of a component such as a camera module, and thus have completed the present invention.

That is, the polyester resin composition of the present invention includes polyester resin (A), and a copolymer (C); and may further include, as necessary, one or more selected from the group consisting of a thermoplastic resin (B), an inorganic filler (D), a flame retardant (E), a flame retardant auxiliary (F), and carbon black (G).

1-1. Polyester Resin (A)

Polyester resin (A) preferably has a structure including a dicarboxylic acid component unit (a1) including a component unit derived from aromatic dicarboxylic acid, and a dialcohol component unit (a2) including a component unit derived from a dialcohol having an alicyclic skeleton.

The dicarboxylic acid component unit (a1) constituting the polyester resin (A) is preferably composed of 30 to 100 mol % of a terephthalic acid component unit, 0 to 70 mol % of an aromatic dicarboxylic acid component unit other than terephthalic acid, and 0 to 70 mol % of an aliphatic dicarboxylic acid component unit having carbon atoms of 4 to 20 (where the total amount of the dicarboxylic acid component unit (a1) is set to 100 mol %).

The dicarboxylic acid component unit (a1) more preferably includes 40 to 100 mol % of the terephthalic acid component unit, 0 to 60 mol % of the aromatic dicarboxylic acid component unit other than terephthalic acid, and 0 to 60 mol % of the aliphatic dicarboxylic acid component unit having carbon atoms of 4 to 20 (preferably 6 to 12) (the total amount of the dicarboxylic acid component unit (a1) is set to 100 mol %).

Examples of the aromatic dicarboxylic acid component unit other than terephthalic acid include units derived from isophthalic acid, 2-methyl terephthalic acid and naphthalene dicarboxylic acid, and a combination thereof. While the number of carbon atoms of the aliphatic dicarboxylic acid component unit is not particularly limited, this unit is preferably a unit derived from an aliphatic dicarboxylic acid having carbon atoms of 4 to 20, preferably 6 to 12. Examples of the aliphatic dicarboxylic acid that derives the aliphatic dicarboxylic acid component unit include adipic acid, suberic acid, azelaic acid, sebacic acid, decane dicarboxylic acid, undecane dicarboxylic acid, and dodecane dicarboxylic acid.

The dicarboxylic acid component unit (a1) constituting the polyester resin (A) may include a component unit derived from an alicyclic dicarboxylic acid such as cyclohexanedicarboxylic acid.

The dicarboxylic acid component unit (a1) may include a small amount, for example, about 10 mol % or less, of a polyvalent carboxylic acid component unit in addition to the constituent units as described above. Specific examples of such a polyvalent carboxylic acid component unit include a tribasic acid and a polybasic acid, such as trimellitic acid and pyromellitic acid.

On the other hand, the dialcohol component unit (a-2) constituting the polyester resin (A) preferably includes an alicyclic dialcohol component unit. The alicyclic dialcohol component unit preferably includes a component unit derived from a dialcohol having an alicyclic hydrocarbon skeleton having carbon atoms of 4 to 20. Examples of the dialcohol having the alicyclic hydrocarbon skeleton include an alicyclic dialcohol such as 1,3-cyclopentanediol, 1,3-cyclopentanedimethanol, 1,4-cyclohexanediol, 1,4-cyclohexanedimethanol, 1,4-cycloheptanediol, and 1,4-cycloheptanedimethanol. From the viewpoints of heat resistance, water absorption properties, availability, and the like, the component unit derived from a dialcohol having a cyclohexane skeleton is preferable among those, and the component unit derived from cyclohexanedimethanol is more preferable.

The ratio of the alicyclic dialcohol component unit (preferably, dialcohol component unit having the cyclohexane skeleton) based on the dialcohol component unit (a2) is preferably 60 to 100 mol % (the total amount of the dialcohol component unit (a2) is set to 100 mol %).

While the alicyclic dialcohol includes isomers such as cis/trans isomers, and the like, the trans configuration is preferable from the viewpoint of heat resistance. Accordingly, the cis/trans ratio is preferably from 50/50 to 0/100, and more preferably from 40/60 to 0/100.

The dialcohol component unit (a2) may include an aliphatic dialcohol component unit, in addition to the alicyclic dialcohol component unit. The aliphatic dialcohol component unit may raise the melt-flowability of the polyester resin (A). Specific examples of the aliphatic dialcohol component unit include ethylene glycol, trimethylene glycol, propylene glycol, tetramethylene glycol, neopentyl glycol, hexamethylene glycol, and dodecamethylene glycol.

The melting point (Tm) or glass transition temperature (Tg) of the polyester resin (A) measured with a differential scanning calorimeter (DSC) is 250° C. or higher. The lower limit is preferably 270° C., and more preferably 280° C. On the other hand, the upper limit is preferably 350° C., for example, and more preferably 335° C. When the melting point or glass transition temperature is 250° C. or higher, the deformation of the molded product or the occurrence of a blister during reflow soldering is suppressed, and the molded product is excellent in heat resistance (mechanical physical properties and shape stability) in the case of using it as a base material for applications involving a heat treatment process at a high temperature. While the upper limit temperature is not limited in principle, a melting point or glass transition temperature of 350° C. or lower is preferable because the decomposition of the polyester resin (A) can be suppressed during melt molding.

The intrinsic viscosity [η] of the polyester resin (A) is preferably from 0.3 to 1.0 dl/g. When the intrinsic viscosity is in such a range, the flowability of the polyester resin composition during molding may be excellent. The intrinsic viscosity of the polyester resin (A) can be adjusted by, for example, adjusting the molecular weight of the polyester resin (A). A known method, such as adjusting the degree of completion of a polycondensation reaction or adding a suitable amount of a monofunctional carboxylic acid, a monofunctional alcohol, or the like, can be employed as a method of adjusting the molecular weight of the polyester resin.

The intrinsic viscosity of the polyester resin (A) is a value calculated from the following expression, wherein the polyester resin (A) is dissolved in a mixed solvent of phenol and tetrachloroethane in 50/50% by mass, and the falling time (seconds) of the sample solution is measured using an Ubbelohde viscometer under a condition of 25° C.±0.05° C.

$$[\eta] = \eta SP/[C(1+0.205\ \eta SP)]$$

[η]: intrinsic viscosity (dl/g)
ηSP: specific viscosity
C: sample concentration (g/dl)

t: falling time (seconds) of sample solution
t₀: falling time (seconds) of a solvent $\eta SP = (t-t_0)/t_0$ The polyester resin (A) may be a polyester resin not demonstrating melt liquid crystallinity. The melt liquid crystallinity refers to a characteristic demonstrating optical anisotropy (liquid crystallinity) in a melt phase. A molded product of a liquid crystalline polymer is easily fibrillated, and thus there is a risk that particulates such as particles may occur. On the other hand, in a resin composition including the polyester resin (A) not demonstrating melt liquid crystallinity, fibrillation of a molded product is suppressed, and the occurrence of particulates such as particles may also be suppressed.

Further, the polyester resin composition may also include a plurality of polyester resins (A) having different physical properties, as necessary. In addition, other thermoplastic resins may also be included as long as they are within the object of the present invention.

The content of the polyester resin (A) in the polyester resin composition of the present invention is preferably 30 to 85 parts by mass based on 100 parts by mass of the total amount of the polyester resin (A), the thermoplastic resin (B), the copolymer (C) and the inorganic filler (D), and is more preferably 30 to 80 parts by mass. This is because, when the content ratio of the polyester resin (A) is within a range between the upper limit and the lower limit described above, it is possible to obtain a resin composition excellent in heat resistance and capable of resisting the reflow soldering process without impairing moldability.

Further, the content of the polyester resin (A) in the polyester resin composition of the present invention is preferably 30 to 80 parts by mass based on 100 parts by mass of the total amount of the polyester resin (A), the copolymer (C), the carbon black (G) and the inorganic filler (D), and is more preferably 35 to 75 parts by mass.

1-2. Copolymer (C)

The copolymer (C) is a copolymer having a structural unit derived from an olefin, a structural unit derived from an α,β-unsaturated carboxylate ester and a structural unit having a cyclic oxyhydrocarbon structure. The copolymer (C) is reacted with a hydroxyl group or a carbonyl group being a terminal group of non-liquid crystalline polyester resin (A) to suppress the lowering of the molecular weight of the polyester resin (A). Accordingly, any elastomer can be used with no particular limitation as long as the elastomer is capable of achieving the enhancement of toughness of the resin composition.

Examples of the olefin of the "structural unit derived from an olefin" constituting the copolymer (C) include ethylene, propylene, 1-butene, 1-hexene, 1-octene, and 1-decene, with ethylene being preferable. Examples of the α,β-unsaturated carboxylate ester of the structural unit derived from an α,β-unsaturated carboxylate ester include acrylic esters such as methyl acrylate, ethyl acrylate and butyl acrylate, and methacrylic esters such as methyl methacrylate and ethyl methacrylate, with methyl acrylate being preferable. Examples of the structural unit having a cyclic oxyhydrocarbon structure include a structural unit derived from an α,β-unsaturated carboxylic glycidyl ester. Examples of the α,β-unsaturated carboxylic glycidyl ester include acrylic glycidyl ester and methacrylic glycidyl ester, with methacrylic glycidyl ester being preferable.

As the copolymer (C), it is preferable to use, for example, an ethylene-methyl acrylate-glycidylmethacrylate copolymer as set forth in the following structural formula:

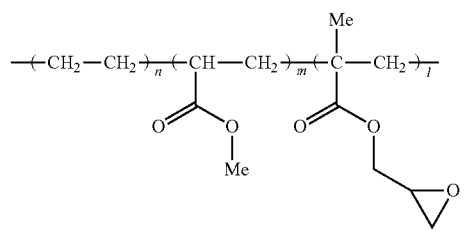 [SMILES: CCCC(CC(C)(CC)C(=O)OCC1CO1)C(=O)OC]

(where, n, m, and l denote an integer)

In the copolymer (C) represented by the above formula, the content ratio of the ethylene unit based on the total amount (100% by mass) of the ethylene unit, the methyl acrylate unit, and the glycidyl methacrylate unit is preferably 30 to 99% by mass, and more preferably 50 to 95% by mass. In the copolymer (C) represented by the above formula, the content ratio of the methyl acrylate unit based on the total amount (100% by mass) of the ethylene unit, the methyl acrylate unit, and the glycidyl methacrylate unit is preferably 0 to 60% by mass, and more preferably 0 to 40% by mass. In the copolymer (C) represented by the above formula, the content ratio of the glycidyl methacrylate unit based on the total amount (100% by mass) of the ethylene unit, the methyl acrylate unit, and the glycidyl methacrylate unit is preferably 1 to 30% by mass.

The copolymer (C) may include other copolymer components in addition to the above copolymer components, unless the reactivity with the polyester resin (A) is inhibited. Specific examples of other copolymer components include α,β-unsaturated glycidyl ethers such as allyl glycidyl ether and 2-methyl allyl glycidyl ether; aromatic vinyl compounds such as styrene, α-methylstyrene, 4-methylstyrene, 4-methoxystyrene, chlorostyrene, and 2,4-dimethylstyrene; and unsaturated vinyl esters such as vinyl acetate and vinyl propionate.

Examples of production methods of the copolymer (C) include a method of copolymerizing an olefin and a monomer having the α,β-unsaturated carboxylate ester and the cyclic oxyhydrocarbon structure by polymerization methods such as high pressure radical polymerization method, solution polymerization method, and emulsion polymerization method, and a method of graft-polymerizing a monomer having a glycidyl group or the α,β-unsaturated carboxylate ester to a polymer containing an ethylene unit such as polyethylene.

The content of the copolymer (C) in the polyester resin composition of the present invention is preferably 0.5 to 10 parts by mass based on 100 parts by mass of the total amount of the polyester resin (A), the thermoplastic resin (B), the copolymer (C) and the inorganic filler (D). This is because, when the content of the copolymer (C) is within a range between the upper limit and the lower limit described above, the mechanical physical properties of the resin composition is enhanced due to sufficient toughness-enhancing effect and the effect of suppressing the lowering of the molecular weight of the polyester resin (A) during heat molding at a high temperature. In a case where the copolymer (C) is included at the ratio of 10 parts by mass or more, the mechanical strength sometimes may be impaired, which is thus not preferable.

The content of the copolymer (C) in the polyester resin composition of the present invention is preferably 0.5 to 5 parts by mass based on 100 parts by mass of the total amount of the polyester resin (A), the copolymer (C), the carbon black (G) and the inorganic filler (D), and is more preferably 1 to 4 parts by mass.

Further, the content of the copolymer (C) in the polyester resin composition of the present invention is preferably 0.1 to 20 parts by mass based on 100 parts by mass of the total amount of the polyester resin (A), the thermoplastic resin (B) and the copolymer (C), and is more preferably 0.5 to 10 parts by mass. When the content of the copolymer (C) is equal to or more than a certain amount, it becomes easier to obtain sufficient toughness-improving effect and the effect of suppressing the lowering of the molecular weight of the polyester resin (A) during heat molding at a high temperature. In addition, when the content of the copolymer (C) is equal to or less than a certain amount, it becomes possible to suppress the excessive increase in melt viscosity.

Since the polyester resin composition of the present invention contains the copolymer (C) together with the polyester resin (A), the mechanical characteristics of the molded product are improved. While the improvement mechanism thereof is not particularly limited, it can be deduced as follows. When a cyclic oxyhydrocarbon structure (e.g., epoxy group) of the copolymer (C) and a hydroxyl group or a carboxyl group being a terminal group of the polyester resin (A) are reacted, the molecular weight of the resin component is increased. As a result, the lowering of the molecular weight during heat molding at a high temperature is suppressed, and thus the mechanical strength is considered to be enhanced thereby. Further, it is considered that the reaction between the copolymer (C) that is an elastomer and the polyester resin (A) reinforces the resin interface, thereby improving the toughness.

Further, the polyester resin composition of the present invention contains the copolymer (C) together with the polyester resin (A), thereby making it possible to suppress dripping in contact with flame in the UL combustion test. This is because the melt tension of the resin composition is enhanced due to a branched structure generated by the reaction between the copolymer (C) and the polyester resin (A).

1-3. Thermoplastic Resin (B)

The thermoplastic resin (B) is a thermoplastic resin having a structural unit derived from an olefin and an aromatic hydrocarbon structure. In this case, it is preferable that, in the thermoplastic resin (B), the structural unit derived from the olefin includes a structural unit derived from ethylene; and the structural unit having the aromatic hydrocarbon structure includes a structural unit derived from styrene.

The thermoplastic resin (B) is preferably a thermoplastic resin having a polyolefin skeleton, and an aromatic hydrocarbon structure. That is, the resin composition of the first embodiment of the present invention can include, as the thermoplastic resin (B), a thermoplastic resin including the polyolefin skeleton and the aromatic hydrocarbon structure. The aromatic hydrocarbon structure may be a structural unit derived from a vinyl compound having the aromatic hydrocarbon structure typified by styrene, or the like, as described later.

The thermoplastic resin (B) is a thermoplastic resin having the polyolefin skeleton and the aromatic hydrocarbon structure, and the intrinsic viscosity [η] thereof measured at 135° C. in decalin is from 0.04 to 1.0 dl/g. The preferable lower limit of the intrinsic viscosity is 0.05 dl/g, and more preferably 0.07 dl/g. On the other hand, the preferable upper limit is 0.5 dl/g, and more preferably 0.2 dl/g. When the intrinsic viscosity is too low, there is a possibility that the thermoplastic resin (E) may easily bleed out unnecessarily from the polyester resin composition for a camera module. Further, it is likely to cause an odor or smoke generation during mold processing. On the other hand, when the intrinsic viscosity is too high, there is a case where the effect of enhancing melt viscosity (enhancing flowability during injection molding) may become insufficient, causing the moldability to be lowered.

The melt viscosity (mPa·s) of the thermoplastic resin (B) at 140° C. is preferably 10 to 2,000 mPa·s, more preferably 20 to 1,500 mPa·s, and most preferably 30 to 1,200 mPa·s. When the melt viscosity of the thermoplastic resin (B) at 140° C. is too low, there is a possibility that the thermoplastic resin (B) may easily bleed out unnecessarily from the resin composition. Further, it is likely to cause an odor or smoke generation during mold processing. On the other hand, when the intrinsic viscosity of the thermoplastic resin (B) at 140° C. is too high, the effect of enhancing the melt viscosity of the resin composition sometimes may become insufficient. The above viscosity may be measured with a Brookfield viscometer.

The thermoplastic resin (B) may be typically obtained by allowing a vinyl compound having the aromatic hydrocarbon structure typified by styrenes or the like to react with a wax referred to as polyolefin wax (hereinafter, may be referred to as polyolefin wax (b)) in the presence of a radical generator such as a nitrile or a peroxide. Such the thermoplastic resin (B) may also be referred to as, what is called, a modified wax.

In particular, the thermoplastic resin (B) is preferably the one in which 1 to 900 parts by mass, more preferably 10 to 300 parts by mass, and most preferably 20 to 200 parts by mass of a vinyl compound having the aromatic hydrocarbon structure such as styrene is introduced into 100 parts by mass of the above polyolefin wax (b). When there is too less structure derived from the aromatic hydrocarbon, the effect of enhancing melt viscosity (enhancing flowability during injection molding) as well as the effect of enhancing dispersibility in the resin composition of the copolymer (C) described above sometimes may become insufficient. On the other hand, when there is too many structures derived from the aromatic hydrocarbon, the odor sometimes may be strong.

The content ratio of the aromatic hydrocarbon structure of the thermoplastic resin (B) can be specified by conventional methods such as the charge ratio of the polyolefin wax (e) to the vinyl compound having the aromatic hydrocarbon structure during the preparation, and the structure identification by the nuclear magnetic resonance spectroscopy analyzer (NMR) of a 100 to 600 MHz class, the ratio of the absorption intensity of a phenyl structure carbon to that of other carbon, and the ratio of the absorption intensity of a phenyl structure hydrogen to that of other carbon. Of course, for the structure identification, it is also possible to use infrared absorption spectrum analysis and the like in combination.

The following conditions can be shown as specific NMR measurement conditions. In the case of $^1$H NMR measurement, the measurement is carried out by using an ECX400-type nuclear magnetic resonance apparatus manufactured by JEOL Ltd. under the conditions of deuterated orthodichlorobenzene as a solvent, a sample concentration of 20 mg/0.6 mL, a measurement temperature of 120° C., an observation nucleus of $^1$H (400 MHz), a sequence of a single pulse, a pulse width of 5.12 μseconds (45° pulse), a repetition time of 7.0 seconds, and an integration count of 500 times or more. While the reference chemical shift is defined by setting hydrogen of tetramethylsilane to 0 ppm, the same results can also be obtained, for example, by setting the peak derived from residual hydrogen of deuterated orthodichlorobenzene to 7.10 ppm as the reference value of the chemical shift. The peak of $^1H$ or the like derived from a functional group-containing compound was assigned by a conventional method.

In the case of $^{13}C$ NMR measurement, the measurement is carried out using an ECP500-type nuclear magnetic resonance apparatus manufactured by JEOL Ltd. as a measuring apparatus under the conditions of an orthodichlorobenzene/deuterated benzene (80/20 vol. %) mixed solvent as a solvent, a measurement temperature of 120° C., an observation nucleus of $^{13}C$ (125 MHz), single pulse proton decoupling, a 45° pulse, a repetition time of 5.5 seconds, an integration count of 10,000 times or more, and a reference value of the chemical shift of 27.50 ppm. Assignment of various signals can be carried out based on a conventional method, and quantitative analysis can be carried out based on the integrated value of signal strength.

Other simple methods for measuring the content ratio of functional group structural units may include a method including determining in advance the functional group content ratio of polymers each having a different functional group content ratio by the above NMR measurement, carrying out infrared spectroscopy (IR) measurement of these polymers, preparing a calibration curve based on the intensity ratio of a specific peak, and determining the functional group content ratio based on this result. This method is simple as compared with the NMR measurement described above, but it is basically necessary to prepare respectively corresponding calibration curves depending on the types of base resins or functional groups. From these reasons, this method is preferably used, for example, for the process control in the resin production in a commercial plant.

While the types of the vinyl compound having the aromatic hydrocarbon structure are not particularly limited, examples thereof include styrene, α-methylstyrene, o-methylstyrene, m-methylstyrene, and p-methylstyrene. Styrene is preferable among these.

Examples of the polyolefin wax (b) include homopolymers of α-olefins such as ethylene, propylene, 1-butene, 1-hexene, 4-methyl-1-pentene, and 1-decene, and ethylene-based wax, propylene-based wax, and 4-methyl-1-pentene-based wax prepared by copolymerizing two or more α-olefins. Among these polyolefin waxes, ethylene-based wax essentially composed of ethylene is suitable.

The number average molecular weight of the polyolefin wax (b) is preferably 400 to 12,000, more preferably 500 to 5,000, and most preferably 600 to 2,000. When the molecular weight of the polyolefin wax (b) is too low, there is a possibility that the thermoplastic resin (B) may easily bleed out unnecessarily from the resin composition. On the other hand, when the molecular weight is too high, the effect of enhancing melt viscosity of the resin composition sometimes may be insufficient.

The number average molecular weight of the polyolefin wax (b) can be determined by GPC measurement under the following conditions.

Apparatus: Gel permeation chromatograph Alliance GPC2000 type (manufactured by Waters Corporation)
Solvent: o-dichlorobenzene
Column: TSK gel column (manufactured by Tosoh Corporation)×4
Flow rate: 1.0 ml/min
Sample: 0.15 mg/mL o-dichlorobenzene solution
Temperature: 140° C.
Calibration curve: Prepared by using a commercially available monodisperse standard polystyrene.

Molecular weight conversion: In terms of PE/general-purpose calibration method

It is noted that the following coefficients of the Mark-Houwink viscosity formula shown below can be used for the calculation of general-purpose calibration.

Coefficients of polystyrene (PS): $KPS=1.38\times10^{-4}$, $aPS=0.70$

Coefficients of polyethylene (PE): $KPE=5.06\times10^{-4}$, $aPE=0.70$

As described above, the thermoplastic resin (B) is obtained by introducing the vinyl compound having the aromatic hydrocarbon structure into the polyolefin wax (b).

The polyolefin wax (b) is obtained, for example, by polymerizing a corresponding olefin at a low pressure or an intermediate pressure. Examples of the polymerization catalyst suitably used for polymerization include a transition metal-containing olefin polymerization catalyst including, as typical examples, a magnesium-supported titanium catalyst described in Japanese Patent Application Laid-Open Nos. SHO 57-63310, SHO 58-83006 and HEI 3-706, Japanese Patent No. 3476793, Japanese Patent Application Laid-Open Nos. HEI 4-218508, 2003-105022, and the like, and a metallocene catalyst described in International Publication Nos. WO01/53369 and WO01/27124, Japanese Patent Application Laid-Open Nos. HEI 3-193796 and HEI 2-41303. Further, the polyolefin wax (b) can also be obtained by thermal decomposition or radical decomposition of a corresponding olefin polymer such as polyethylene or polypropylene by a conventional method.

Further, as a method for introducing an aromatic structure to the polyolefin wax (b), a method in which, in the presence of both the above olefin polymer and a polymer of an aromatic vinyl compound such as polystyrene, these components are subjected to thermal decomposition or radical decomposition is also one of the suitable examples, in addition to the above-described method in which the polyolefin wax (b) is allowed to react with the vinyl compound having the aromatic hydrocarbon structure in the presence of the radical generator such as a nitrile and a peroxide. In the thermal decomposition reaction and the radical decomposition reaction, a decomposition reaction is dominant, but a recombination reaction is expected to occur in combination. Therefore, by using such a method, it is also possible to introduce an aromatic structure into a polyolefin skeleton.

The content of the thermoplastic resin (B) in the polyester resin composition of the present invention is preferably 0.1 to 10 parts by mass based on 100 parts by mass of the total amount of the polyester resin (A), the thermoplastic resin (B), the copolymer (C) and the inorganic filler (D). When the content of the thermoplastic resin (B) is within a range between the upper limit and the lower limit described above, the melt viscosity of the resin composition is lowered, and the dispersibility of the copolymer (C) in the resin composition is enhanced, allowing the reaction between the polyester resin (A) and the copolymer (C) to easily proceed uniformly. This is because the mechanical strength of the resin composition is enhanced while maintaining the effect of enhancing the mold releasability and flowability during injection molding which the thermoplastic resin (B) originally has. The case of including the thermoplastic resin (B) at a ratio of 10 parts by mass or more is not preferable, because sometimes the appearance may be deteriorated due to bleeding-out, and in addition the mechanical characteristics may be impaired.

The content of the thermoplastic resin (B) in the polyester resin composition of the present invention is preferably 0.1 to 10 parts by mass based on 100 parts by mass of the total amount of the polyester resin (A), the copolymer (C), the carbon black (G) and the fibrous inorganic filler (D), and more preferably 0.5 to 3 parts by mass.

Further, the content of the thermoplastic resin (B) in the polyester resin composition of the present invention is preferably 0.1 to 15 parts by mass based on 100 parts by mass of the total amount of the polyester resin (A), the thermoplastic resin (B) and the copolymer (C), and more preferably 0.5 to 10 parts by mass. When the content of the thermoplastic resin (B) is equal to or more than a certain amount, it is easier to lower the melt viscosity of the resin composition including the copolymer (C) as well as to raise the dispersibility of the copolymer (C). On the other hand, when the content of the thermoplastic resin (B) is equal to or less than a certain amount, it becomes possible to suppress bleeding-out and the lowering of mechanical characteristics.

The total amount of the polyester resin (A), the thermoplastic resin (B) and the copolymer (C) in the polyester resin composition of the present invention is preferably 30 parts by mass or more based on 100 parts by mass of the total of the resin composition, and more preferably 50 parts by mass or more.

The polyester resin composition of the present invention further contains the thermoplastic resin (B) together with the polyester resin (A) and the copolymer (C), thereby improving the moldability of the resin composition. While the improving mechanism thereof is not particularly limited, it may be deduced as follows. When the copolymer (C) and the polyester resin (A) are reacted, a branched polymer is generated thereby allowing the melt viscosity of the resin composition to be raised. At that time, in a case where the copolymer (C) is not dispersed sufficiently, the melt viscosity is locally raised, causing heat generation to further occur locally. Therefore, an excessive branched structure (crosslinking) easily occurs ununiformly, causing the flowability during injection molding to be lowered, and causing the mold releasability to be lowered due to the lowering of the crystallinity of the resin composition.

In contrast, the polyester resin composition of the present invention further includes the thermoplastic resin (B) together with the above-described copolymer (C), thereby enhancing the dispersibility of the copolymer (C). Therefore, the local increase of viscosity of the resin composition and the occurrence of the uniform branched structure can be suppressed. Accordingly, it is considered that the mold releasability and flowability during injection molding of the resin composition are enhanced, allowing the moldability to be improved.

Further, the polyester resin composition of the present invention contains the thermoplastic resin (B) having the aromatic hydrocarbon structure (e.g., polystyrene skeleton) together with the copolymer (C), thereby improving the mechanical characteristics of a molded product of the polyester resin composition. While the improving mechanism thereof is not particularly limited, the dispersibility of the copolymer (C) in the resin composition is enhanced due to the action of the thermoplastic resin (B), and as a result the reaction between the polyester resin (A) and the copolymer (C) easily proceeds uniformly. As a result, it is considered that the mechanical strength is enhanced, while maintaining the mold releasability which the thermoplastic resin (B) originally has. Further, it is considered that, with the enhanced dispersibility of the copolymer (C), it becomes easier to obtain a uniform branched structure, allowing stable mechanical physical properties not influenced by the time for injection molding to be obtained.

1-4. Inorganic Filler (D)

As the inorganic filler (D), a known inorganic filler can be used. Specifically, it is preferable to use an inorganic filler having a high aspect ratio, in a fibrous, powdery, granular, tabular, needle-like, cloth-like or mat-like shape. Specific examples thereof include glass fibers, inorganic compounds having a carbonyl structure (such as a whisker of carbonates such as calcium carbonate), hydrotalcite, titanates such as potassium titanate, wollastonite, xonotlite, aluminum borate whisker, magnesium sulfate whisker, sepiolite, zinc oxide whisker, milled fibers, and cut fibers. One type of these inorganic fillers may be used alone, or alternatively two or more types thereof may also be used in combination.

Among these, fibrous inorganic fillers (also referred to as fibrous reinforcing materials) are preferable, and examples thereof include glass fibers, wollastonite, potassium titanate whisker, calcium carbonate whisker, aluminum borate whisker, magnesium sulfate whisker, sepiolite, xonotlite, zinc oxide whisker, milled fibers, and cut fibers.

The fibrous inorganic filler preferably may be a glass fibers (BG), or an inorganic compound having a carbonyl structure (BW). The inorganic filler may be treated with a known compound such as a silicone compound. In particular, the glass fiber treated with a silicone compound is one of the preferable embodiments.

Further, from the viewpoint of enhancing the surface smoothness of the polyester resin composition, the fibrous inorganic filler preferably may be one selected from the group consisting of wollastonite and potassium titanate whisker. This is because wollastonite and potassium titanate whisker have a relatively smaller fiber diameter. In order to enhance the surface smoothness of a molded product, it is preferable to make the size of a fibrous inorganic filler to be used as small as possible, and it is particularly desirable to make the fiber diameter smaller. One example of a factor deteriorating the surface smoothness of a molded product is the difference in contraction coefficients between the resin component and the fibrous inorganic filler. When the fiber diameter of the fibrous inorganic filler is smaller, the surface smoothness demonstrates the tendency of not being impaired. The polyester resin composition having higher surface smoothness of a molded product is suitable, for example, as a polyester resin composition for a camera module as described later.

The average length of the inorganic filler (D) is preferably 10 mm or less, more preferably 5 mm or less, still more preferably 300 μm or less, even still more preferably 100 μm or less, and most preferably 50 μm or less. For example, when that average length is 300 μm or less, the dimensional stability of a molded product of the polyester resin composition of the present invention is easily enhanced, the anisotropy of dimensional change is lower, and the surface smoothness is easily enhanced. Further, when that resin composition is used as a polyester resin composition for a camera module, the occurrence of particles from the molded product is suppressed. While the lower limit of the average length of the inorganic filler (D) is not particularly limited, it may be preferably 0.1 μm, and more preferably 10 μm.

The average length of the inorganic filler (D) can be measured by the following method. That is, the inorganic filler is dispersed in water, each fiber length (Li) of arbitrary 300 fibers is measured using an optical microscope (magnification: 50 times), the number of fibers having a fiber length of Li is set as qi, and weight average length (Lw) is calculated based on the following formula, to set the calculated value as the average length of the inorganic filler.

Weight average length $(Lw)=(\Sigma qi \times Li^2)/(\Sigma qi \times Li)$

The aspect ratio (L average fiber length/D average fiber diameter) of the inorganic filler (D) is preferably 1 to 500, more preferably 10 to 350, still more preferably 1 to 100, and even still more preferably 5 to 70. The use of the inorganic filler within such a range is preferable in terms of the enhancement of the strength of the molded product, the lowering of a coefficient of linear expansion, and the like.

As the inorganic filler (D), two or more types of inorganic fillers having different lengths and aspect ratios may be used in combination.

Specific examples of the inorganic filler having a relatively larger length and aspect ratio (DL) include glass fibers, silicates such as wollastonite (calcium silicate), and titanates such as potassium titanate whisker as described above. Among these, glass fibers are preferable.

The lower limit of the length of the inorganic filler (DL) is preferably 15 μm, more preferably 30 μm, and still more preferably 50 μm. On the other hand, the upper limit is preferably 10 mm, more preferably 8 mm, still more preferably 6 mm, and even still more preferably 5 mm. In particular, in the case of glass fibers, the lower limit is preferably 500 μm, more preferably 700 μm, and still more preferably 1 mm.

The lower limit of the aspect ratio of the inorganic filler (DL) is preferably 20, more preferably 50, and still more preferably 90. On the other hand, the upper limit is preferably 500, more preferably 400, and still more preferably 350.

Preferable examples of the inorganic filler having a relatively smaller length and aspect ratio (DS) than those of the inorganic filler as described above include an inorganic filler having a carbonyl group (BW), and specific examples thereof include a whisker of carbonates such as calcium carbonate.

The aspect ratio of the above inorganic filler having a carbonyl group is preferably 1 to 300, more preferably 5 to 200, and still more preferably 10 to 150.

The content of the inorganic filler (D) in the polyester resin composition of the present invention is preferably 1 to 50 parts by mass based on 100 parts by mass of the total amount of the polyester resin (A), the thermoplastic resin (B), the copolymer (C) and the inorganic filler (D), and more preferably 10 to 50 parts by mass. This is because, when the content of the inorganic filler (D) is equal to or more than the lower limit described above, the molded product has a tendency of not deforming during injection molding and in the reflow soldering process. In addition, this is because, when the content is equal to or less than the upper limit described above, it becomes possible to obtain a molded product having better moldability and appearance.

The content of the fibrous inorganic filler (D) in the polyester resin composition of the present invention is within a range of 20 to 50 parts by mass based on 100 parts by mass of the total amount of the polyester resin (A), the copolymer (C), the carbon black (G) and the fibrous inorganic filler (D), and preferably within a range of 25 to 45 parts by mass. It becomes possible to enhance the reflow heat resistance of the resin composition and to improve the low anisotropy of a molded product. Further, the surface of the molded product is smoothed, and the low dust property is improved.

The polyester resin composition of the present invention further includes the inorganic filler (D), thereby making it possible to enhance the mechanical strength and the heat resistance of the molded product. Furthermore, the combined use of the inorganic filler (DL) and the inorganic filler (DS) having different lengths and aspect ratios is considered to improve the dispersibility of the inorganic filler in a base polymer. Further, enhanced affinity between the base polymer and the inorganic filler is considered to efficiently enhance heat resistance, mechanical strength, and the like.

1-5. Flame Retardant (E)

The flame retardant (E) may be added for the purpose of lowering the combustibility of a resin. In order to apply it to a resin composition for electric and electronic components and surface-mounted components that often require higher flame retardancy and flame resistance of V-0 specified in Underwriters Laboratories standard UL 94, it is preferable to prepare a resin composition with a flame retardant being blended therewith.

Known compounds can be used for the flame retardant (E), and are not particularly limited. Examples of the flame retardant (E) include halogen compounds, phosphate compounds, phosphoric ester compounds, metal hydroxide compounds, silicone compounds, nitrogen compounds, and the like. The flame retardant is preferably brominated polystyrene, polybrominated styrene, brominated polyphenylene ether, a metal salt of phosphoric acid compound, phosphazene compound, or melamine polyphosphate, from the viewpoint of obtaining a higher flame retardancy effect and higher mechanical physical properties with a smaller amount of addition. It is more preferable to adopt brominated polystyrene, polybrominated styrene, or an aluminum salt of phosphoric acid compound. Among these, it is preferable to use brominated polystyrene or polybrominated styrene as flame retardant (E).

The brominated polystyrene that is the flame retardant (E) is a brominated product of polystyrene or poly α-methylstyrene. The styrene or α-methylstyrene is used as a raw material to subject it to polymerization reaction to give polystyrene, followed by further bromination to afford brominated polystyrene, in which a part of hydrogen atoms bonded to carbon atoms that form an aromatic ring is substituted with bromine atoms. Further, depending on a production method, a part of hydrogen atoms bonded to carbon atoms that form an alkyl chain constituting the main skeleton of a polymer sometimes may also be substituted with bromine atoms. As the flame retardant (E), it is preferable to adopt brominated polystyrene in which a part of hydrogen atoms bonded to carbon atoms that form an aromatic ring is substituted with bromine atoms, and hydrogen atoms bonded to carbon atoms that form an alkyl chain constituting the main skeleton of a polymer are not substantially substituted with bromine atoms. Furthermore, the content of bromine in brominated polystyrene that is the flame retardant (E) is preferably 65 to 71% by mass, and more preferably 67 to 71% by mass.

The phrase "hydrogen atoms bonded to carbon atoms that form an alkyl chain constituting the main skeleton of a polymer are not substantially substituted with bromine atoms" means that, among hydrogen atoms bonded to carbon atoms that form an alkyl chain constituting the main skeleton of a polymer, the ratio of hydrogen atoms substituted with bromine atoms is 0 to 0.5% by mass, and preferably 0 to 0.2% by mass. Such the brominated polystyrene has higher heat stability, and in addition the heat stability of a resin composition or a molded product thereof obtained by using it is also enhanced.

The content of the flame retardant (E) in the polyester resin composition of the present invention is preferably 10 to 40 parts by mass based on 100 parts by mass of the total amount of the polyester resin (A), the thermoplastic resin (B), the copolymer (C) and the inorganic filler (D), and more preferably 10 to 30 parts by mass. This is because, when the content of the flame retardant (E) is equal to or more than the lower limit described above, stable flame retardancy is obtained.

1-6. Flame Retardant Auxiliary (F)

Any flame retardant auxiliary (F) may be adopted as long as it enhances the flame retardancy action of flame retardant (E) when blended with flame retardant (E), and a known flame retardant auxiliary can be used. Specific examples of the flame retardant auxiliary (F) include antimony compounds such as antimony trioxide, antimony tetroxide, antimony pentoxide and sodium antimonate; zinc compounds such as zinc borate, zinc stannate and zinc phosphate; and calcium borate, and calcium molybdate. One of these flame retardant auxiliaries may be used alone, or alternatively two or more types thereof may also be used in combination. Among these, sodium antimonate, zinc borate, and zinc phosphate are preferable. Further, from the viewpoint of heat stability during molding, sodium antimonate, and anhydrous zinc borate ($2ZnO.3B_2O_3$) is preferable.

Furthermore, the flame retardant auxiliary (F) is preferably a combination of sodium antimonate (F1) and anhydrous zinc borate ($2ZnO.3B_2O_3$) (F2). The use thereof in combination may achieve UL94-VO standard with a smaller amount of the flame retardant (E). When the flame retardant auxiliary (F) is the combination of the sodium antimonate (F1) and the anhydrous zinc borate (F2), the mass ratio to each other (F1/F2) is typically 100/0 to 1/99, preferably 99/1 to 30/70, and more preferably 90/10 to 50/50.

The content of the flame retardant auxiliary (F) in the polyester resin composition of the present invention is preferably 1 to 20 parts by mass based on 100 parts by mass of the total amount of the polyester resin (A), the thermoplastic resin (B), the copolymer (C) and the inorganic filler (D), and more preferably 1 to 10 parts by mass. This is because, when the content of the flame retardant auxiliary (F) is equal to or more than the lower limit described above, stable flame retardancy is obtained.

When the flame retardant auxiliary (F) includes the sodium antimonate (F1) and the anhydrous zinc borate (F2), the content of the sodium antimonate (F1) in the polyester resin composition of the present invention is typically 0 to 20 parts by mass based on 100 parts by mass of the total amount of the polyester resin (A), the thermoplastic resin (B), the copolymer (C) and the inorganic filler (D), and preferably 0.1 to 10 parts by mass. On the other hand, the content of the anhydrous zinc borate (F2) is typically 0 to 10 parts by mass based on 100 parts by mass of the total amount of the polyester resin (A), the thermoplastic resin (B), the copolymer (C) and the inorganic filler (D), preferably 0.1 to 5 parts by mass, and more preferably 0.1 to 3 parts by mass.

The polyester resin composition of the present invention further includes the flame retardant (E) and the flame retardant auxiliary (F), thereby making it possible to impart better flame retardancy to the molded product. That is, it is considered that the combined use of a predetermined amount of brominated polystyrene or polybrominated styrene as the flame retardant (E) and a predetermined amount of the flame retardant auxiliary (F) makes it possible to shorten the combustion time or the lingering flame time of the resin, enabling high-level flame retardancy be imparted. Thereby, it is considered that, due to the dripping prevention effect obtained by containing the copolymer (C) as described above and the specific flame-retardant formulation, stable V-0 characteristics are obtained.

1-7. Carbon Black (G)

The polyester resin composition of the present invention may further include the carbon black (G) when it is used as a polyester resin composition for a camera module to be described later, for example. The carbon black (G) may function as a colorant that colors the resin composition black.

The types of the carbon black (G) are not particularly limited, and generally available one that is used for the coloring of a resin can be used. Examples of commercially available products include "#980B" manufactured by Mitsubishi Chemical Corporation and "REGAL 99I" manufactured by Cabot Corporation.

The content of the carbon black (G) in the polyester resin composition of the present invention is preferably within a range of 0.5 to 5.0 parts by mass based on 100 parts by mass of the total amount of the polyester resin (A), the copolymer (C), the carbon black (G) and the fibrous inorganic filler (D), and more preferably within a range of 0.8 to 2.0 parts by mass. When the carbon black (G) is contained within the above range, it becomes possible to obtain a camera module component member that is more excellent in a light-shielding property. Therefore, it is possible to prevent the outer light from leaking into an imaging element of the camera module through the camera module component member. On the other hand, when the content of the carbon black (G) is too high, there is a case where the moldability of the resin composition may be lowered, or the insulation property, mechanical characteristics, or the like of the molded product may be lowered.

1-8. Arbitrary Additive

The polyester resin composition of the present invention can contain the following additives, depending on applications, in such a range as not to impair the effect of the present invention: antioxidants (such as phenols, amines, sulfurs, and phosphori), heat-resistant stabilizers (such as lactone compounds, vitamin Es, hydroquinones, copper halides, and iodine compounds), light stabilizers (such as benzotriazoles, triazines, benzophenones, benzoates, hindered amines, and oxanilides), other polymers (such as polyolefins, ethylene-propylene copolymers, olefin copolymers such as an ethylene-1-butene copolymer, olefin copolymers such as a propylene-1-butene copolymer, polystyrene, polyamide, polycarbonate, polyacetal, polysulfone, polyphenylene oxide, fluororesins, silicone resins, and LCP), flame retardants (such as bromine-based, chlorine-based, phosphorus-based, antimony-based, and inorganic flame retardants), fluorescent brightening agents, plasticizers, thickeners, antistatic agents, mold-releasing agents, colorants, pigments, crystal nucleating agents, and various known compounding agents.

Further, the content of these additives in the polyester resin composition of the present invention is, while it varies depending on the types of the components, preferably 0 to 10 parts by mass based on 100 parts by mass of the total of the polyester resin (A) and the copolymer (C), or based on 100 parts by mass of the total of the polyester resin (A), the thermoplastic resin (B) and the copolymer (C), more preferably 0 to 5 parts by mass, and still more preferably 0 to 1 part by mass.

When the polyester resin composition of the present invention is used in combination with other additives, selection of the above additives sometimes may be essential. For example, it is self-evident that, when other additives to be used in combination include a catalyst, the above-mentioned additives including a component or an element that can be a catalyst poison should be preferably avoided. Examples of the preferable additives that should be avoided as described above can include components including phosphorus or sulfur.

As described above, the polyester resin composition of the present invention is excellent in moldability. Moreover, a molded article to be obtained from the polyester resin composition of the present invention has better mechanical characteristics (strength and toughness) and reflow heat resistance, and in addition is also excellent in dimensional stability due to lower water absorption properties. Therefore, the polyester resin composition of the present invention may be preferably used in applications for which these characteristics can be utilized: for example, as a material for electric and electronic components or a material for automobile mechanism components. That is, the molded article to be obtained by injection-molding the polyester resin composition of the present invention may constitute, for example, electric and electronic components or automobile mechanism components.

Further, the polyester resin (A) included in the polyester resin composition of the present invention may be a non-crystalline polyester resin (A) not demonstrating melt liquid crystallinity. Such the polyester resin composition may suppress the fibrillation of the molded product, and may also suppress the occurrence of particulates such as particles. Such the polyester resin composition is suitable for a polyester resin composition used for a sliding member of electric and electronic components, automobile mechanism components, or the like, preferably a polyester resin composition for a camera module.

As described above, the present invention has been described with reference to the embodiment. However, it should not be understood that the description included as a part of the disclosure has a limiting effect on the present invention. The disclosure articulates various alternative embodiments, examples, and operation technologies for a person skilled in the art. Accordingly, the technical scope of the present invention is determined merely by the features of the invention according to the appended claims reasonably arrived based on the description above.

2. Production Method of Polyester Resin Composition

The polyester resin composition of the present invention can be produced by a known method, for example, a method in which the above components are mixed with a Henschel mixer, a V-blender, a ribbon blender, a tumbler blender, or the like, or a method in which, after the mixing, the mixture is further melt-kneaded with a single-screw extruder, a multi-screw extruder, a kneader, a Banbury mixer, or the like and then granulated or ground.

The melt-kneading is carried out at a temperature 5° C. to 30° C. higher than the melting point of the polyester resin (A). The lower limit of the melt-kneading temperature is preferably set to 255° C., and more preferably 275° C.; the upper limit is preferably set to 360° C., and more preferably 340° C.

3. Application

The molded product of the polyester resin composition of the present invention has, as described above, better mechanical characteristics and moldability. Therefore, the molded product of the polyester resin composition of the present invention can be preferably used for various electric and electronic components, automobile mechanism components, or the like. Among these, the molded product of the polyester resin composition of the present invention has higher surface smoothness and may have lower particle properties, and thus can be preferably used for a sliding member in electric and electronic components, automobile mechanism components, or the like.

The sliding member indicates one or more members of two or more members sliding against each other (relatively). The sliding also includes a screwing movement as illustrated in FIG. 1 to be described later. For example, the sliding member in the camera module illustrated in FIG. 1 described later indicates one of or both of a barrel and a holder. Examples of components having the sliding member include camera modules, electric appliances, shaft bearings for office equipment/power equipment, various gears, cams, bearings, end face materials for mechanical sealing, valve sheets for valve, V-rings, rod packings, piston rings, rotary shafts and rotary sleeves for compressor, pistons, impellers, vanes, and rotors. That is, the polyester resin composition of the present invention can be used as a polyester resin composition for the sliding member; and preferably as a polyester resin composition for the camera module.

The camera module of the present invention is characterized in that the polyester resin composition of the present invention is included in a part of its constituent components. The example of the camera module is illustrated in FIG. 1. The camera module illustrated in FIG. 1 has substrate 1, imaging element 2 mounted on substrate 1, holder 5 disposed on substrate 1 so as to surround imaging element 2, cylindrical barrel 4 provided rotationally at a spiral part at the upper part of holder 5, lens 3 attached to the inside of the cylinder of barrel 4, and IR filer 6 provided between lens 3 and imaging element 2. Imaging element 2 may be CCD or CMOS.

Light having passed through lens 3 enters imaging element 2 through IR filter 6. Here, the rotation of barrel 4 changes the distance between lens 3 and imaging element 2, and thus the focus of the camera module can be adjusted.

The camera module of the present invention preferably includes the polyester resin composition of the present invention in at least one of the barrel and the holder. The polyester resin composition of the present invention may be included in both of the barrel and the holder, or alternatively the polyester resin composition of the present invention may be included only in one of them.

The barrel and the holder may be integrated. An integrated product of the barrel and the holder may be molded with the polyester resin composition for the camera module of the present invention.

The camera module components including the polyester resin composition of the present invention can be obtained, for example, by injection-molding the polyester resin composition.

EXAMPLES

In the following, the present invention is further described with reference to Examples and Comparative Examples, which however shall not be construed as limiting the technical scope of the present invention.

Polyester Resin (A)

(Production of Polyester Resin (A))

To 106.2 parts of dimethyl terephthalate and 94.6 parts of 1,4-cyclohexanedimethanol (cis/trans ratio: 30/70), was added 0.0037 parts of tetrabutyl titanate, and the temperature was raised from 150° C. to 300° C. over 3 hours and 30 minutes to allow them to undergo ester exchange reaction.

At the completion of the above ester exchange reaction, 0.066 parts of magnesium acetate tetrahydrate dissolved in 1,4-cyclohexanedimethanol was added, and thereto was subsequently introduced 0.1027 parts of tetrabutyl titanate to carry out polycondensation reaction. In the polycondensation reaction, the pressure was gradually reduced from normal pressure to 1 Torr over 85 minutes, and at the same time, the temperature was raised to a predetermined polymerization temperature of 300° C. to hold the temperature and the pressure. The reaction was completed when a predetermined stirring torque was reached, and a produced polymer was removed. Further, the obtained polymer was subjected to solid phase polymerization at 260° C. and 1 Torr or less for 3 hours. The obtained polymer (polyester resin (A)) had an [η] of 0.6 dl/g and a melting point of 290° C.

Resin for Comparison (Production of Polyamide Resin)

4,819.4 g (29.01 mol) of terephthalic acid and 4,772.4 g (30.15 mol) of a mixture of 1,9-diaminononane and 2-methyl-1,8-diaminooctane [former/latter=70/30 (mol ratio)], 241.8 g (1.98 mol) of benzoic acid, 9.8 g of sodium hypophosphite monohydrate and 2.5 liter of distilled water were charged into an autoclave with an internal volume of 20 liter to subject them to nitrogen substitution. The mixture was stirred at 100° C. for 30 minutes, and the temperature inside the autoclave was raised to 220° C. over 2 hours. At that time, the pressure inside the autoclave was raised to 2 MPa. The reaction was continued for 2 hours as it was, then the temperature was raised to 230° C., subsequently the temperature was kept at 230° C. for 2 hours, and the steam was gradually released to allow the mixture to undergo the reaction while keeping the pressure at 2 MPa. Next, the pressure was reduced to 1 MPa over 30 minutes. Further, the mixture was allowed to undergo the reaction for 1 hour to give a prepolymer having an intrinsic viscosity [η] of 0.14 dl/g.

The prepolymer was dried at 100° C. for 12 hours under reduced pressure, and ground until it came to have a particle diameter of 2 mm or less. The prepolymer was subjected to solid phase polymerization at 230° C. and 13 Pa (0.1 mmHg) for 10 hours to afford a white polyamide resin having a melting point of 306° C. and an intrinsic viscosity [η] of 0.78 dl/g.

Thermoplastic Resin (B)

(B1) Low Molecular Weight Thermoplastic Resin: A mixture of an ethylene polymer-based wax obtained with a known solid titanium catalyst component and styrene was allowed to react in the presence of a known radical generator to afford the following low molecular weight thermoplastic resin (B1).

Viscosity measured at 135° C. in decalin: 0.10 dl/g

Melt viscosity at 140° C.: 1,100 mPs·s

Styrene unit content ratio: 60% by mass (B2) Low Molecular Weight Thermoplastic Resin: A mixture of an ethylene polymer-based wax obtained with a known solid titanium catalyst component and styrene was allowed to react in the presence of a known radical generator to afford the following low molecular weight thermoplastic resin (B2).

Viscosity measured at 135° C. in decalin: 0.11 dl/g

Melt viscosity at 140° C.: 1,200 mPs·s

Styrene unit content ratio: 20% by mass (Compound for comparison) calcium montanate: Licomont CaV102 manufactured by Clariant K.K.

Copolymer (C)

Ethylene-methylacrylate-glycidylmethacrylate copolymer (LOTADER AX8900 manufactured by Arkema Inc.)

Inorganic Filler (D)

Inorganic filler (D1): glass fiber: length: 3 mm, aspect ratio: 300 (ECS03-615, a product treated with a silane compound, manufactured by Central Glass Co., Ltd.)

Inorganic filler (D2): wollastonite (NYGLOS 4W manufactured by NYCO, Inc.)

Inorganic filler (D3): potassium titanate whisker (TXAX-MA manufactured by Kubota Corporation)

Inorganic filler (D4): glass fiber (ECS03T-790DE manufactured by Nippon Electric Glass Co., Ltd.)

Inorganic filler (D5): milled fiber (EFH-100-31 manufactured by Central Glass Co., Ltd.)

Flame Retardant (E): brominated polystyrene (product name: HP-3010 manufactured by Albemarle Corporation, bromine content: 68% by mass)

Flame Retardant Auxiliary (F)

(F1) sodium antimonate (product name: SA-A manufactured by Nihon Seiko Co., Ltd.)

(F2) zinc borate (FIREBRAKE 500 manufactured by BORAX Inc.)

Carbon Black (G): "#980B" manufactured by Mitsubishi Chemical Corporation

Examples 1 to 5, Comparative Examples 1 to 3

The respective components listed in Table 1 were mixed at mass ratios indicated in Table 1. The mixture was charged into a vent-equipped twin-screw extruder set at a temperature of 300° C., and melt-kneaded to afford the resin compositions (compounds) of Examples 1 to 5 and Comparative Examples 1 to 3. It is noted that the mass ratios of the respective components were set to 100% by mass in total.

The physical properties (toughness, residence stability, mold releasability, and flowability during injection molding) of the obtained resin compositions were evaluated by the following method. The results are shown in Table 1.

[Flexural Test (Toughness)]

Using the following injection molding machine, molding was carried out under the following conditions to give a test piece having a length of 64 mm, a width of 6 mm, and a thickness of 0.8 mm. It is noted that a mold-releasing agent was used at the time of molding the test piece. The test piece was allowed to stand at a temperature of 23° C. in a nitrogen atmosphere for 24 hours. Next, the resulting test piece was subjected to flexural test under the conditions of a span of 26 mm and a flexural rate of 5 mm/min using a flexural test machine AB5 manufactured by NTESCO in an atmosphere of a temperature of 23° C. and a relative humidity of 50% to measure flexural strength, the amount of deformation, elastic modulus, and energy (toughness) required for breaking the test piece. It is noted that, the larger the value of toughness is, the better the toughness is.

Molding machine: Sodick Plustech Co., Ltd., Tuparl TR40S3A

Molding machine cylinder temperature: melting point (Tm)+10° C., and

Mold temperature: 150° C.

[Residence Stability (Flexural Test)]

In the injection molding of the above flexural test piece (64 mm in length, 6 mm in width, 0.8 mm in thickness), the flexural test piece was produced under four conditions of the residence time inside the injection molding machine cylinder, as 1.5 minutes, 3 minutes, 5 minutes and 7 minutes. Then, the flexural test similar to the above was carried out to evaluate as follows: 1 in the case where the difference between the maximum value and the minimum value of the flexural strength of each of the four samples is less than ±1% of the intermediate value; 2 in the case of less than ±2%; and 3 in the case of equal to or more than ±2%.

[Mold Releasability]

In the injection molding of the above flexural test piece (64 mm in length, 6 mm in width, 0.8 mm in thickness), the cooling time inside the mold was modified to carry out molding without using a mold-releasing agent, or the like. Then, the minimum cooling time that enables the test piece to be released from the mold under the following conditions was determined to set this as an index of the mold releasability. It is noted that, the shorter the cooling time is, the better the mold releasability is.

Molding machine: Sodick Plustech Co., Ltd., Tuparl TR40S3A

Molding machine cylinder temperature: melting point (Tm)+10° C., and

Mold temperature: 150° C.

[Flowability During Injection Molding]

A bar-flow mold having a width of 10 mm and a thickness of 0.5 mm was used for injection molding under the following conditions to measure the flow length (mm) of the resin inside the mold. It is noted that, the longer the flow length is, the better the flowability during injection molding is.

Injection molding machine: Sodick Plustech Co., Ltd., Tuparl TR40S3A

Injection set pressure: 2,000 kg/cm$^2$,

Cylinder set temperature: melting point (Tm)+10° C., and

Mold temperature: 150° C.

distribution to be generated, thereby making it difficult to control the reaction during injection molding.

From the results of Example 2 and Comparative Example 2, it was observed that the addition of the copolymer (C) enhanced toughness and residence stability without impairing flowability during injection molding and mold releasability. The reason why the results were obtained is considered to be because the addition of the copolymer (C) allowed the polyester resin (A) and the copolymer (C) that is an elastomer component to react to be polymerized, thereby suppressing the lowering of the molecular weight of the polyester resin (A) during heat molding, as well as reinforcing the resin interface between the polyester resin (A) and the copolymer (C), enabling to achieve a sufficient toughness-improving effect. Further, the reason why the residence stability was enhanced is considered to be because the combination of the low molecular weight thermoplastic resin (B1) and the copolymer (C) allows the reaction between the polyester resin (A) and the copolymer (C) to proceed uniformly, thereby stably suppressing the lowering of the molecular weight of the polyester resin (A), leading to less variation in mechanical physical properties due to a residence time.

From the results of Examples 1 to 5 and Comparative Example 3, it was observed that the use of the low molecular weight thermoplastic resin (B1) enhanced mold releasability, flowability during injection molding, and residence stability compared to the case of adding calcium montanate. The reason why the results were obtained is considered to be

TABLE 1

|  | Unit | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| (A) Polyester Resin | % by mass | 66 | 64 | 62 | 66 | 62 | 67 | 67 | 66.5 |
| (B) Low Molecular Weight Thermoplastic Resin B1 | % by mass | 3 | 3 | 3 | 1 | 5 | — | 3 | — |
| Low Molecular Weight Thermoplastic Resin B2 | % by mass | — | — | — | — | — | — | — | — |
| CA Montanate | % by mass | — | — | — | — | — | — | — | 0.5 |
| (C) Copolymer | % by mass | 1 | 3 | 5 | 3 | 3 | 3 | — | 3 |
| (D) Inorganic Filler D1 | % by mass | 30 | 30 | 30 | 30 | 30 | 30 | 30 | 30 |
| Mold Releasability | sec | <7 | <7 | 9 | 12 | <7 | Not Released | <7 | 10 |
| Injection Flowability | mm | 37 | 35 | 34 | 32 | 38 | 25 | 39 | 25 |
| Tenacity | mJ | 43 | 52 | 59 | 53 | 53 | 51 | 36 | 51 |
| Residence Stability | — | 1 | 1 | 2 | 2 | 1 | 3 | 3 | 3 |

As shown in Table 1, in Examples 1 to 5, mold releasability, flowability during injection molding, toughness, and residence stability were better. While the reasons for these results are not clear, it is possible to consider as follows, in comparison with the comparative examples.

From the results of Example 5 and Comparative Example 1, it was observed that the combined use of the low molecular weight thermoplastic resin (B1) and the copolymer (C) enhanced mold releasability and residence stability. This is considered to be because the combined use of the low molecular weight thermoplastic resin (B1) and the copolymer (C) allowed the copolymer (C) to be dispersed uniformly in the resin composition, resulting in the suppression of the local generation of a branched structure due to the copolymer (C) in a part of the polyester resin (A). On the other hand, in Comparative Example 1 in which only the copolymer (C) is added, it is considered that the local generation of the branched structure was not suppressed, causing a resin composition having a broader composition because the use of the low molecular weight thermoplastic resin (B1) enhanced the uniformity of the copolymer (C) in the resin composition.

Examples 6 to 11, Comparative Examples 4 to 6

The respective components listed in Table 2 were mixed at mass ratios indicated in Table 2. The mixture was charged into a vent-equipped twin-screw extruder set at a temperature of 300° C., and melt-kneaded to afford the resin compositions (compounds) of Examples 6 to 11 and Comparative Examples 4 to 6. It is noted that the mass ratios of the respective components were set to 100% by mass in total.

The physical properties (toughness, residence stability, mold releasability, flowability during injection molding, and flame retardancy) of the obtained resin compositions were evaluated. The evaluations of toughness, residence stability, mold releasability, and flowability during injection molding were carried out in the manner similar to the above; and the evaluation of flame retardancy was carried out by the following method. The results are shown in Table 2.

[Combustion Test]

The test piece having a thickness of $\frac{1}{32}$ inches, a width of $\frac{1}{2}$ inches, and a length of 5 inches prepared by injection molding was used to carry out the vertical combustion test in accordance with UL94 standard (UL test No. UL94 dated Jun. 18, 1991), and the flame retardancy was evaluated. In this case, the results are shown in Table 1 in such a manner as "Drip Occurred" for a drip that occurred during the test, and as "No Drip" for a sample in which no drip occurred.

Injection molding machine: Sodick Plustech Co., Ltd., Tuparl TR40S3A

Molding machine cylinder temperature: melting point (Tm)+10° C., and

Mold temperature: 150° C.

(C) allows the reaction between the polyester resin (A) and the copolymer (C) to proceed uniformly, thereby stably suppressing the lowering of the molecular weight of the polyester resin (A), leading to less variation in mechanical physical properties due to a residence time.

From the results of Examples 6 to 11 and Comparative Examples 4 and 5, it was observed that the combined use of the low molecular weight thermoplastic resin (B1) and the copolymer (C) enhanced mold releasability and residence stability. The reason why the results were obtained is considered to be because the combined use of the low molecular weight thermoplastic resin (B1) and the copolymer (C) allows the copolymer (C) to be dispersed uniformly in the resin composition, resulting in the suppression of the local generation of a branched structure due to the copolymer (C) in a part of the polyester resin (A). On the other hand, in Comparative Examples 4 and 5 in which only one of the

TABLE 2

| | | Unit | Ex. 6 | Ex. 7 | Ex. 8 | Ex. 9 | Ex. 10 | Ex. 11 | Comp. Ex. 4 | Comp. Ex. 5 | Comp. Ex. 6 |
|---|---|---|---|---|---|---|---|---|---|---|---|
| Composition | (A) Polyester Resin | % by mass | 41.3 | 39.3 | 37.3 | 44.0 | 41.3 | 37.3 | 42.3 | 42.3 | 41.8 |
| | (B) Low Molecular Weight Thermoplastic Resin B1 | % by mass | 3 | 3 | 3 | 3 | 1 | 5 | 3 | — | — |
| | CA Montanate | % by mass | — | — | — | — | — | — | — | — | 0.5 |
| | (C) Copolymer | % by mass | 1 | 3 | 5 | 3 | 3 | 3 | — | 3 | 3 |
| | (D) Inorganic Filler D1 | % by mass | 30 | 30 | 30 | 30 | 30 | 30 | 30 | 30 | 30 |
| | (E) Brominated Polystyrene | % by mass | 21 | 21 | 21 | 14 | 21 | 21 | 21 | 21 | 21 |
| | (F1) Sodium Antimonate | % by mass | 3 | 3 | 3 | 4.7 | 3 | 3 | 3 | 3 | 3 |
| | (F2) Zinc Borate | % by mass | 0.7 | 0.7 | 0.7 | 1.3 | 0.7 | 0.7 | 0.7 | 0.7 | 0.7 |
| Moldability | Mold Releasability | sec | <7 | 8 | 12 | 12 | 14 | <7 | <7 | Not Released | Not Released |
| | Injection Flowability | mm | 38 | 32 | 27 | 31 | 26 | 35 | 40 | 20 | 22 |
| Mechanical Characteristics | Strength | MPa | 175 | 182 | 186 | 187 | 184 | 183 | 175 | 180 | 168 |
| | Tenacity | mJ | 22 | 24 | 27 | 31 | 24 | 25 | 15 | 14 | 20 |
| | Residence Stability | — | 2 | 1 | 1 | 1 | 2 | 1 | 3 | 2 | 3 |
| Combustibility Test | UL94 Vertical Test Judgment | — | V-0 | V-0 | V-0 | V-0 | V-0 | V-0 | V-2 | V-0 | V-0 |
| | Drip | — | No drip | No drip | No drip | No drip | No drip | No drip | Drip occurred | No drip | No drip |
| | Reason for Judgment | — | | | | | | | Ignition of Cotton due to Drip | | |

As shown in Table 2, in Examples 6 to 11, mold releasability, flowability during injection molding, toughness, residence stability, and flame retardancy were better. While the reasons for these results are not clear, it is possible to consider as follows, in comparison with the comparative examples.

From the results of Example 7 and Comparative Example 4, it was observed that the addition of the copolymer (C) enhanced toughness and residence stability as well as prevented dripping, thereby improving flame retardancy. The reason why the results were obtained is considered to be because the addition of the copolymer (C) allowed the polyester resin (A) and the copolymer (C) that is an elastomer component to react to be polymerized, thereby suppressing the lowering of the molecular weight of the polyester resin (A) during heat molding, as well as reinforcing the resin interface between the polyester resin (A) and the copolymer (C), enabling to achieve a sufficient toughness-improving effect. Further, it is considered that, since the molecular weight of the polyester resin (A) is increased together with branched structures, thereby enhancing the melt tension of the resin, which contributes to the prevention of a drip. The reason why the residence stability was enhanced is considered to be because the combination of the low molecular weight thermoplastic resin and the copolymer (C) and the low molecular weight thermoplastic resin (B1) is added, it is considered that the local generation of a branched structure was not easily suppressed, causing a resin composition having a broader composition distribution to be generated, thereby making it difficult to control the reaction during injection molding.

From the results of Examples 6 to 11 and Comparative Example 6, it was observed that the use of the low molecular weight thermoplastic resin (B1) enhanced flowability during injection molding and residence stability compared to the case of adding calcium montanate. The reason why the results were obtained is considered to be because the use of the low molecular weight thermoplastic resin (B1) enhanced the uniformity of the copolymer (C) in the resin composition. On the other hand, it is considered that, in Comparative Example 6, calcium montanate functioned also as an acid scavenger, and captured an acid (HBr) having occurred from the flame retardant to generate a carboxyl group, which carboxyl group was reacted with an epoxy group of the copolymer (C), causing the mold-releasing effect to be lowered.

Example 12

The polyester resin (A1), the copolymer (B), the carbon black (G), the fibrous inorganic filler (D), and the thermoplastic resin (E) were mixed using a tumbler blender at a ratio as indicated in Table 3. The mixture was melt-kneaded, as a raw material, in a twin-screw extruder TEX30α manufactured by Japan Steel Works, Ltd. at a cylinder temperature 15° C. higher than the melting point of the resin, and then extruded into a strand shape. The strand was cooled in a water tank, drawn by a pelletizer, and cut to thereby afford a composition in a pellet shape. That is, better compound properties were demonstrated.

Examples 13 to 21, Comparative Example 7

The resin compositions were prepared in the same manner as in Example 12 except that the compositions as indicated in Table 3 were adopted.

Each of the physical properties of the obtained polyester resin compositions was evaluated by the following method. The results are shown in Table 3.

[Flexural Test]

The test piece having a length of 64 mm, a width of 6 mm, and a thickness of 0.8 mm having been prepared under the following molding conditions using the following injection molding machine was allowed to stand at a temperature of 23° C. in a nitrogen atmosphere for 24 hours. Next, the resulting test piece was subjected to flexural test under the conditions of a span of 26 mm and a flexural rate of 5 mm/min using a flexural test machine (AB5 manufactured by NTESCO) in an atmosphere of a temperature of 23° C. and a relative humidity of 50% to measure the strength, elastic modulus, and deflection amount of the test piece.

Molding machine: Sodick Plustech Co., Ltd., Tuparl TR40S3A

Molding machine cylinder temperature: melting point (Tm)+10° C., and

Mold temperature: 150° C.

[Reflow Heat Resistance]

The test piece having a length of 64 mm, a width of 6 mm, and a thickness of 0.8 mm having been prepared under the following molding conditions using the following injection molding machine was humidity-conditioned at a temperature of 40° C. and a relative humidity of 95% for 96 hours.

Molding machine: Sodick Plustech Co., Ltd., Tuparl TR40S3A

Molding machine cylinder temperature: melting point (Tm)+10° C., and

Mold temperature: 150° C.

Figure 2:
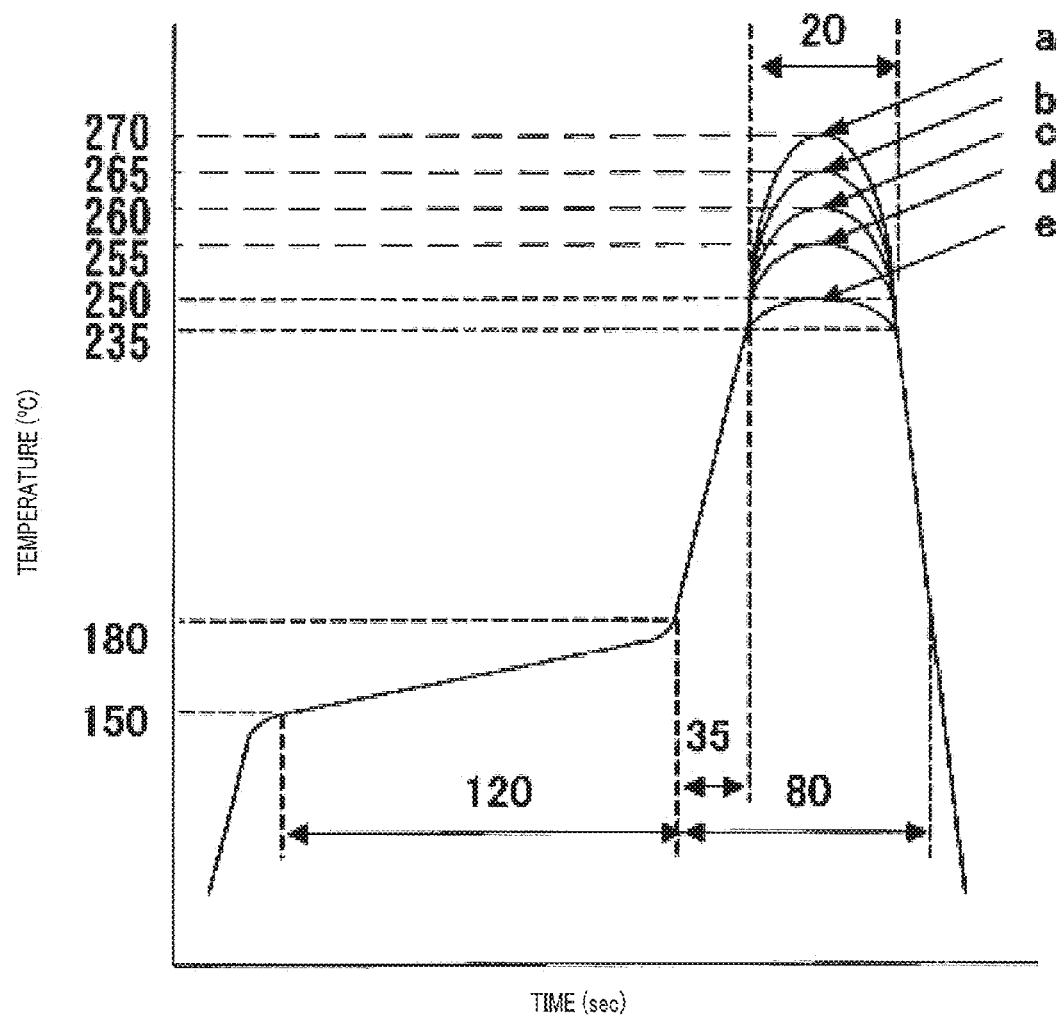
FIG. 2 is a graph illustrating a temperature profile of a reflow process.

The resulting test piece was subjected to reflow process according to a temperature profile shown in FIG. 2 using an air reflow soldering apparatus (AIS-20-82-C manufactured by Eightech Tectron Co., Ltd.).

The above humidity-conditioned test piece was placed on a glass epoxy substrate having a thickness of 1 mm, and a temperature sensor was installed on the substrate to measure the profile. In FIG. 1, the temperature was raised to 230° C. at a predetermined rate. Next, the temperature was raised to predetermined temperatures (a: 270° C., b: 265° C., c: 260° C., d: 255° C., e: 250° C.) in 20 seconds by heating, and then the temperature was lowered to 230° C. In this case, the maximum value of each of preset temperatures at which the test piece is not melted and no blister occurs on the surface of the test piece was determined, and this maximum value of each of the preset temperatures was defined as a reflow heat-resistant temperature.

[Flowability]

A bar-flow mold having a width of 10 mm and a thickness of 0.5 mm was used for injection molding under the following conditions to measure the flow length (mm) of the resin in the mold.

Injection molding machine: Sodick Plustech Co., Ltd., Tuparl TR40S3A

Injection set pressure: 2,000 kg/cm$^2$,

Cylinder set temperature: melting point (Tm)+10° C., and

Mold temperature: 150° C.

[Dimensional Stability]

The obtained resin composition was injection-molded at a temperature 10° C. higher than the melting point of the used resin using SE50-type molding machine manufactured by Sumitomo Heavy Industries, Ltd. into a test piece having a length of 50 mm in the MD direction, a length of 30 mm in the TD direction, and a thickness of 0.6 mm. The mold temperature was set to 150° C. The used mold has a recess part formed therein with a pair of parallel lines having an interval of 40 mm in the MD direction and a pair of parallel lines having an interval of 20 mm in the TD direction.

The distances in the MD direction and in the TD direction of the above linear part formed in the test piece were measured, and the contraction rate based on the interval between the lines set in the mold (rate immediately after molding) was determined using an equation [(mold dimension−molded product dimension)/mold dimension].

Next, the above sample was humidity-conditioned at a temperature of 40° C. and a relative humidity of 95% for 96 hours to afford a sample, of which the amount of dimensional change was measured for each of the MD direction and the TD direction to determine the dimensional change rate (water absorption dimensional change rate) using an equation [(dimension after water absorption−dimension before water absorption)/dimension before water absorption].

[Surface Smoothness]

The obtained resin composition was injection-molded at a temperature 10° C. higher than the melting point of the used resin using SE50-type molding machine manufactured by Sumitomo Heavy Industries, Ltd. into a test piece having a width of 30 mm, a length of 30 mm, and a thickness of 0.3 mm. The mold temperature was set to 150° C. The surface shape measurement (WYKO) "NT1100" manufactured by Bruker AXS K.K. was used to measure the surface roughness. The measurement conditions were set as follows: measurement mode: VSI, measurement range: 1.2 mm×0.9 mm, and compensation: Tilt.

[Light Transmissivity]

The obtained resin composition was injection-molded at a temperature 10° C. higher than the melting point of the used resin using SE50-type molding machine manufactured by Sumitomo Heavy Industries, Ltd. into a test piece having a width of 30 mm, a length of 30 mm, and a thickness of 0.5 mm. The mold temperature was set to 150° C. The spectrophotometer "U-4000" manufactured by Hitachi, Ltd. was used to measure a light transmission coefficient at 1,000 nm, a wavelength of the obtained flat plate.

TABLE 3

|  |  | Ex. | | | | | | | | | | Comp. Ex. |
| --- | --- | --- | --- | --- | --- | --- | --- | --- | --- | --- | --- | --- |
|  |  | 12 | 13 | 14 | 15 | 16 | 17 | 18 | 19 | 20 | 21 | 7 |
| Resin | Polyester Resin (A) | 70 | 60 | 50 | 60 | 60 | 80 | 40 | 60 | 60 | 60.8 | 60 |
|  | Polyamide Resin |  |  |  |  |  |  |  |  |  |  |  |
| Copolymer(C) | C | 2 | 2 | 2 | 2 | 4 | 2 | 2 | 2 | 2 | 2 | 2 |
| Carbon Black (G) | G | 1 | 1 | 1 | 1 | 1 | 1 | 1 | 1 | 1 | 0.2 | 1 |
| Fibrous Inorganic | D2 | 25 | 35 | 45 |  | 35 | 15 | 55 |  |  | 35 | 35 |
| Filler (D) | D3 |  |  |  | 35 |  |  |  |  |  |  |  |
|  | D4 |  |  |  |  |  |  |  | 35 |  |  |  |
|  | D5 |  |  |  |  |  |  |  |  | 35 |  |  |
| Thermoplastic Resin (B) | B2 | 2 | 2 | 2 | 2 | 2 | 2 | 2 | 2 | 2 | 2 | 2 |
| Thin Wall Flex | Strength/MPa | 134 | 147 | 166 | 114 | 166 | 105 | 112 | 201 | 149 | 151 | 188 |
|  | Elastic Modulus/MPa | 7243 | 9977 | 13822 | 7633 | 9505 | 5600 | 17588 | 10553 | 7981 | 10032 | 9638 |
|  | Deflection/mm | 4.7 | 3.5 | 2.8 | 3.4 | 5.5 | 6.1 | 1.5 | 3.5 | 3.8 | 3.6 | 4.2 |
| Reflow Heat Resistance | Heat Resistance Temperature/° C. | >270 | >270 | >270 | 260 | 260 | 245 | >270 | >270 | >270 | >270 | >270 |
| Flowability | 0.5 L/t (Flow Length) | 45 | 38 | 29 | 39 | 31 | 65 | 9 | 33 | 37 | 40 | 55 |
| Dimensional Stability | Immediately After Molding -MD | 0.421 | 0.289 | 0.192 | 0.476 | 0.299 | 0.705 | 0.157 | 0.117 | 0.234 | 0.375 | 0.379 |
|  | Immediately After Molding -TD | 0.822 | 0.897 | 0.643 | 0.758 | 0.877 | 0.888 | 0.554 | 0.598 | 0.862 | 0.884 | 0.857 |
|  | Water Absorption Dimensional Change -MD | 0.04 | 0.015 | 0.025 | 0.013 | 0.018 | 0.11 | 0.021 | 0.037 | 0.02 | 0.014 | 0.169 |
|  | Water Absorption Dimensional Change -TD | 0.055 | 0.05 | 0.03 | 0.035 | 0.05 | 0.08 | 0.022 | 0.095 | 0.151 | 0.05 | 0.325 |
| Surface Smoothness | Average Surface Roughness (Ra) WYKO | 199 | 197 | 217 | 218 | 205 | 190 | 336 | 317 | 305 | 189 | 235 |
| Light Transmissivity | % | 0.1 | 0.1 | 0.1 | 0.1 | 0.1 | 0.1 | 0.1 | 0.1 | 0.1 | 0.4 | 0.1 |

The resin composition of the Comparative Example 7 includes polyamide resin, and does not include the polyester resin (A). Therefore, it is observed that the amount of the water absorption dimensional change is larger, and the dimensional stability (in particular, dimensional stability due to water absorption) is not good. On the other hand, the resin compositions of Examples 12 to 21 include the polyester resin (A). Therefore, it is observed that the amount of the water absorption dimensional change is smaller, and the dimensional stability is better.

In particular, Examples 12 to 16 demonstrate excellent results in each item of heat resistance, flowability, surface smoothness, and light transmissivity. It can be observed, in Example 17, that the amount of the fibrous inorganic filler (D) is smaller, and the heat resistance is somewhat lowered. It can be observed, in Example 18, that the amount of the fibrous inorganic filler (D) is larger, and the flowability is somewhat lowered. It can be observed, in Example 19, that the fibrous inorganic filler (D) is a glass fiber, and the surface smoothness of the molded product is lowered. It can be observed, in Example 20, that a milled fiber is included, and the surface smoothness of the molded product is lowered, and that the dimensional change rate is increased. In particular, it can be observed that the change rate after water absorption in the TD direction is increased, and the anisotropy occurs. It can be observed, in Example 21, that the content of the carbon black (G) is smaller, and thus the light transmissivity is increased (light-shielding rate is lowered).

The present application claims the priority based on Japanese Patent Application No. 2012-253430 filed on Nov. 19, 2012, Japanese Patent Application No. 2012-255663 filed on Nov. 21, 2012, and Japanese Patent Application No. 2013-140533 filed on Jul. 4, 2013. All the contents described in the application specification and drawings are incorporated herein by reference.

INDUSTRIAL APPLICABILITY

The polyester resin composition of the present invention has better mechanical characteristics and moldability, as described above. Therefore, a molded product of the polyester resin composition of the present invention can be preferably used for various electric and electronic components, automobile mechanism components, or the like.

Specifically, the polyester resin composition of the present invention is suitable for a constituent component for a camera module, in particular a molding material for a barrel and a holder of the camera module.

REFERENCE SIGNS LIST

1 Substrate
2 Imaging element
3 Lens
4 Barrel
5 Holder
6 IR filter

The invention claimed is:
1. A polyester resin composition comprising:
a polyester resin (A) which is derived from terephthalic acid and cyclohexane dimethanol and which has a melting point or a glass transition temperature of 250° C. or higher;
a thermoplastic resin (B) having a structural unit derived from ethylene and a structural unit derived from styrene and having an intrinsic viscosity [η] of 0.04 to 0.2 dl/g measured at 135° C. in decalin;
a copolymer (C) having a structural unit derived from ethylene, a structural unit derived from methylacrylate and a structural unit derived from glycidylmethacrylate; and an inorganic filler (D), wherein the content of the thermoplastic resin (B) is 1 to 5 parts by mass and the content of the copolymer (C) is 1 to 3 parts by mass, each based on 100 parts by mass of the total amount of the polyester resin (A), the thermoplastic resin (B), the copolymer (C) and the inorganic filler (D), and wherein a flexural test piece formed by molding the polyester resin composition has a maximum flexural strength and a minimum flexural strength each falling within a range of ±2% of an intermediate value of the flexural strength, exclusive of 2%, the flexural strength being measured using 4 flexural test pieces each being 64 mm in length, 6 mm in width, and 0.8 mm in thickness which is molded under conditions such that a molding machine cylinder temperature is 10° C.+melting point (Tm) of the polyester resin (A), a mold temperature is 150° C., and a residence time inside the molding machine cylinder is 1.5 minutes, 3 minutes, 5 minutes and 7 minutes, respectively, for the 4 flexural test pieces, the flexural strength being measured at a span of 26 mm and a flexural rate of 5 mm/min using a flexural test machine at a temperature of 23° C. under a relative humidity of 50%, the maximum flexural strength being the largest value detected among the 4 flexural test pieces, the minimum flexural strength being the smallest value detected among the 4 flexural test pieces, and the intermediate value being calculated using the maximum flexural strength and the minimum flexural strength.

2. The polyester resin composition according to claim 1, comprising:
30 to 80 parts by mass of the polyester resin (A);
1 to 5 parts by mass of the thermoplastic resin (B);
1 to 3 parts by mass of the copolymer (C); and
1 to 50 parts by mass of the inorganic filler (D), provided that the total of (A), (B), (C) and (D) is 100 parts by mass.

3. The polyester resin composition according to claim 1, further comprising:
brominated polystyrene or polybrominated styrene (E); and
a flame retardant auxiliary (F).

4. The polyester resin composition according to claim 3, comprising:
10 to 40 parts by mass of the brominated polystyrene or polybrominated styrene (E); and
1 to 20 parts by mass of the flame retardant auxiliary (F), provided that the total of (A), (B), (C) and (D) is set to 100 parts by mass.

5. The polyester resin composition according to claim 3, wherein the flame retardant auxiliary (F) is at least one compound selected from the group consisting of antimony trioxide, antimony tetroxide, antimony pentoxide, sodium antimonate, zinc borate, zinc stannate, zinc phosphate, calcium borate, and calcium molybdate.

6. The polyester resin composition according to claim 3, wherein the flame retardant auxiliary (F) includes sodium antimonate and zinc borate.

7. The polyester resin composition according to claim 1, wherein
the thermoplastic resin (B) has an intrinsic viscosity [η] of 0.1 to 0.2 dl/g measured at 135° C. in decalin.

8. The polyester resin composition according to claim 1, wherein
the polyester resin composition has a toughness of 22 to 53 mJ,
the toughness being measured using a test piece being 64 mm in length, 6 mm in width, and 0.8 mm in thickness which is molded under conditions such that a molding machine cylinder temperature is 10° C.+melting point (Tm) of the polyester resin (A) and a mold temperature is 150° C.,
the toughness being measured at a span of 26 mm and a flexural rate of 5 mm/min using a flexural test machine at a temperature of 23° C. under a relative humidity of 50%.

9. The polyester resin composition according to claim 1, wherein when the polyester resin composition is molded into a test piece which is 64 mm in length, 6 mm in width, and 0.8 mm in thickness and which is molded under conditions such that a molding machine cylinder temperature is 10° C.+melting point (Tm) of the polyester resin (A) and a mold temperature is 150° C., the test piece is released from a mold, and minimum cooling time for releasing the test piece from the mold is 14 second or less.

10. A molded article obtained by molding the polyester resin composition according to claim 1.

11. An electric or electronic component comprising an injection-molded article of the polyester resin composition according to claim 1.

12. An automobile mechanism component comprising an injection-molded article of the polyester resin composition according to claim 1.

13. A method of producing a polyester resin composition according to claim 2, comprising: melting and kneading,
30 to 80 parts by mass of a polyester resin (A) which is derived from terephthalic acid and cyclohexane dimethanol and which has a melting point or a glass transition temperature of 250° C. or higher,
1 to 5 parts by mass of a thermoplastic resin (B) having a structural unit derived from ethylene and a structural unit derived from styrene and having an intrinsic viscosity [η] of 0.04 to 0.2 dl/g measured at 135° C. in decalin, 1 to 3 parts by mass of a copolymer (C) having a structural unit derived from ethylene, a structural unit derived from methylacrylate and a structural unit derived from glycidylmethacrylate, and
1 to 50 parts by mass of an inorganic filler (D), provided that the total of (A), (B), (C) and (D) is set to 100 parts by mass,
at a temperature 5° C. to 30° C. higher than a melting point of the polyester resin (A).

* * * * *